(12) United States Patent
Pi

(10) Patent No.: US 9,131,465 B2
(45) Date of Patent: Sep. 8, 2015

(54) METHODS AND APPARATUS FOR MAPPING CONTROL CHANNELS TO RESOURCES IN OFDM SYSTEMS

(75) Inventor: Zhouyue Pi, Richardson, TX (US)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 1621 days.

(21) Appl. No.: 11/979,829

(22) Filed: Nov. 8, 2007

(65) Prior Publication Data

US 2008/0304588 A1    Dec. 11, 2008

Related U.S. Application Data

(60) Provisional application No. 60/929,024, filed on Jun. 8, 2007, provisional application No. 60/929,351, filed on Jun. 22, 2007.

(51) Int. Cl.
| | |
|---|---|
| H04K 1/10 | (2006.01) |
| H04L 27/28 | (2006.01) |
| H04W 72/00 | (2009.01) |
| H04B 7/04 | (2006.01) |
| H04B 7/06 | (2006.01) |
| H04L 5/00 | (2006.01) |

(52) U.S. Cl.
CPC ............ *H04W 72/00* (2013.01); *H04B 7/0417* (2013.01); *H04B 7/0452* (2013.01); *H04B 7/0632* (2013.01); *H04B 7/0634* (2013.01); *H04L 5/0032* (2013.01)

(58) Field of Classification Search
CPC ... H04B 7/0417; H04B 7/0452; H04B 7/0632
USPC .................................. 375/260, 267, 295, 316
See application file for complete search history.

(56) References Cited

U.S. PATENT DOCUMENTS

| 7,039,092 B1* | 5/2006 | Cao et al. ...................... 375/140 |
| 2001/0012301 A1* | 8/2001 | Yi et al. .......................... 370/439 |
| 2002/0141331 A1* | 10/2002 | Mate et al. ..................... 370/218 |
| 2007/0211616 A1* | 9/2007 | Khandekar et al. ............ 370/203 |
| 2008/0159323 A1* | 7/2008 | Rinne et al. .................... 370/431 |
| 2010/0067445 A1* | 3/2010 | Rinne et al. .................... 370/329 |
| 2015/0085945 A1* | 3/2015 | Zhang et al. ................... 375/267 |

* cited by examiner

*Primary Examiner* — Freshteh N Aghdam

(57) ABSTRACT

A method for data transmission. The method including the steps of generating at least one resource tree, mapping a plurality of resource elements into respective leaf nodes in the at least one resource tree according to a certain mapping scheme, with each node in the at least one resource tree representing a resource allocation scheme for data transmission, and transmitting data using a resource allocation scheme selected from among the plurality of resource allocation schemes represented by respective nodes in the at least one resource tree. In response to reception of the data, a receiver decodes the data by recursively applying the plurality of resource allocation schemes represented by respective nodes in the at least one resource tree until the data is decoded.

23 Claims, 29 Drawing Sheets

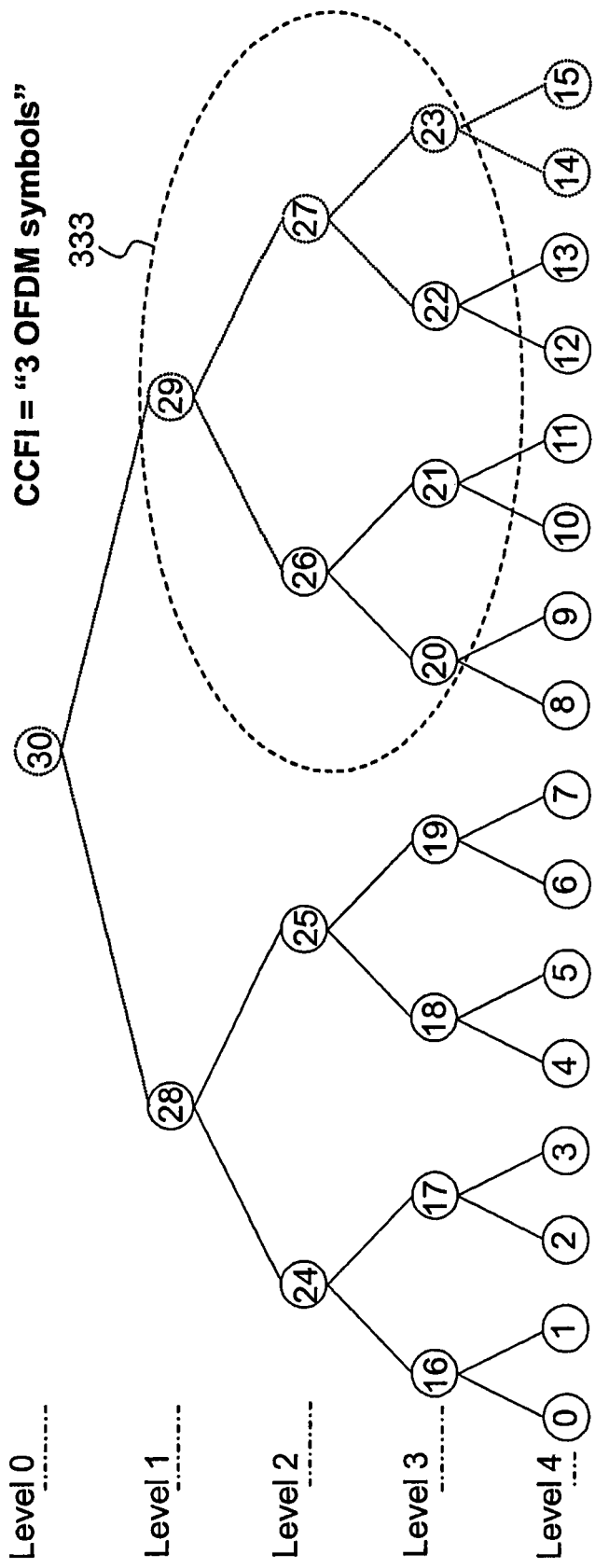

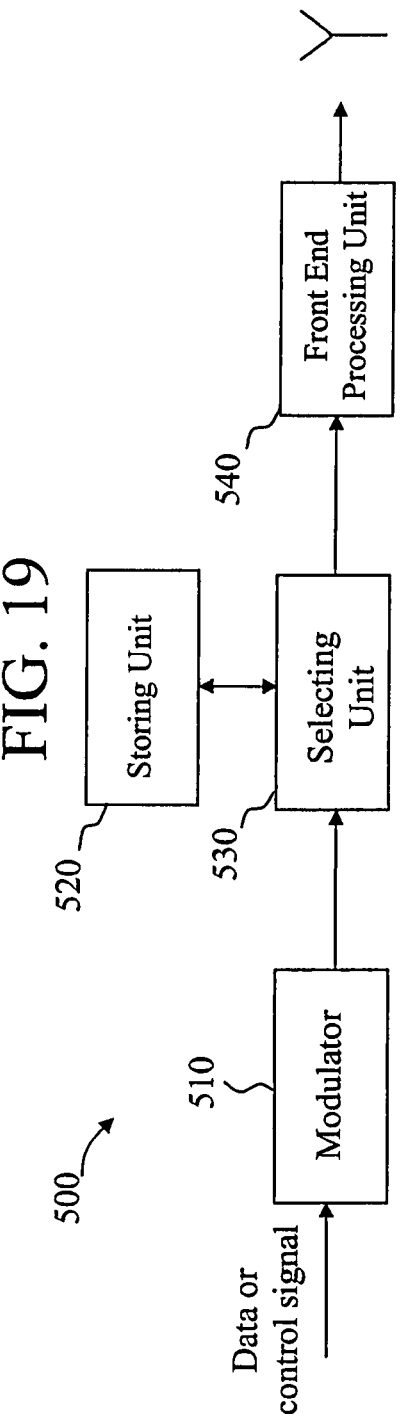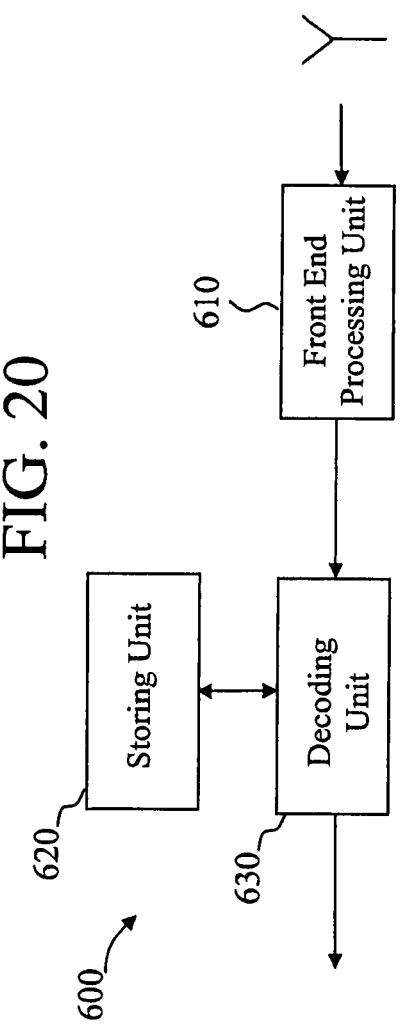

METHODS AND APPARATUS FOR MAPPING CONTROL CHANNELS TO RESOURCES IN OFDM SYSTEMS

CLAIM OF PRIORITY

This application makes reference to, incorporates the same herein, and claims all benefits accruing under 35 U.S.C. §119 from provisional applications earlier filed in the U.S. Patent & Trademark Office on 8 Jun. 2007 and there duly assigned Ser. No. 60/929,024, and on 22 Jun. 2007 and there duly assigned Ser. No. 60/929,351, respectively.

BACKGROUND OF THE INVENTION

1. Field of the Invention

The present invention relates to a method for transmitting data, and more specifically, a method for transmitting data by using resource elements stored in at least one resource trees.

2. Description of the Related Art

Telecommunication enables transmission of data over a distance for the purpose of communication between a transmitter and a receiver. The data is usually carried by radio waves and is transmitted using a limited transmission resource. That is, radio waves are transmitted over a period of time using a limited frequency range.

Usually, the transmission resource available for data transmission is segmented into a plurality of equal duration time and frequency slots, i.e., resource elements. A single resource element or multiple resource elements may be allocated for transmitting the data. When data is transmitted, a control signal may accompany the data to carry information regarding the allocation of the resource elements for the current data transmission. Therefore, when a receiver receives the data and the control signal, the receiver may derive the information regarding resource allocation used for data transmission from the control signal and decodes the received data using the derived information.

If the resource allocation for the control signal is unknown, blind decoding by the receiver can be employed to detect the resource allocation of the control signal, and the control signal itself. Although the receiver may not know the exact resource elements that were used for control signal, the receiver may know several possible resource allocation schemes for control transmission. In this case, the receiver blindly decodes the received control signal by recursively applying one of the possible resource allocation schemes until the received control signal is decoded. In other words, the receiver can attempt to decode the control signal assuming one of the possible resource allocation schemes is used for the control signal. If the decoding fails, the receiver can attempt to decode the control signal again, this time assuming another possible resource allocation scheme. This procedure can be done recursively until the control signal is successfully decoded or the receiver decides to stop the recursion, e.g., after exhausting all possible resource allocation schemes. The method of blind decoding, however, inevitably increases decoding complexity at the receiver.

SUMMARY OF THE INVENTION

It is therefore an object of the present invention to provide an improved system and an improved method for transmitting data.

It is another object to provide an improved system and an improved method for transmitting data in order to efficiently utilize transmission resources.

It is still another object to decrease the decoding complexity at the receiver.

According to one aspect of the present invention, a method for data transmission contemplates generating at least one resource tree, each resource tree comprising a plurality of nodes comprising a root node and at least one leaf node, linked by zero, one or more inner nodes, mapping a plurality of resource elements into respective leaf nodes in the at least one resource tree according to a certain mapping scheme, with each node in the at least one resource tree representing a resource allocation scheme for data transmission, and transmitting data using a resource allocation scheme selected from among the plurality of resource allocation schemes represented by respective nodes in the at least one resource tree.

In the at least one resource tree, each of the leaf nodes that are mapped with resource elements may correspond to one resource element, and represent a resource allocation scheme where the corresponding resource element is allocated for data transmission. Each of the root nodes may correspond to a combination of resource elements represented by the descendant leaf nodes of said root node, and represent a resource allocation scheme where the corresponding combination of resource elements are allocated for data transmission. In addition, each of the inner nodes may correspond to a combination of resource elements represented by the descendant leaf nodes of said inner node, and represent a resource allocation scheme where the corresponding combination of resource elements are allocated for data transmission.

In the at least one resource tree, at least one leaf node may not correspond to any resource element, and may not represent any resource allocation scheme.

After receiving the data, a receiver may decode the data by recursively applying the plurality of resource allocation schemes represented by respective nodes in the at least one resource tree until the data is decoded.

The mapping scheme for mapping the plurality of resource element into respective leaf nodes may be specific for different cells covered by corresponding base stations.

The mapping scheme for mapping the plurality of resource element into respective leaf nodes may change over time.

The mapping scheme for mapping the plurality of resource element into respective leaf nodes may be specific for different receivers.

The generation of the at least one resource trees may be dependent upon the number of resource elements that are available for data transmission.

The mapping scheme for mapping the plurality of resource element into respective leaf nodes may be dependent upon the number of resource elements that are available for data transmission.

The method may further contemplates assigning different subtrees of the at least one resource trees for different number of resource elements that are available for the data transmission. In this case, after receiving the data, the receiver may decode the data by recursively applying a set of resource allocation schemes that are represented by respective nodes in the assigned subtree according to the number of available resource elements until the data is decoded.

The method may further contemplates assigning different subtrees of the at least one resource trees for different number of resource elements that are available for the data transmission, with at least one subtree consisting of selected levels of inner nodes. In this case, after receiving the data, the receiver may decode the received data by recursively applying a set of resource allocation schemes that are represented by respective nodes in the assigned subtree according to the number of available resource elements until the data is decoded.

The method may further contemplates assigning a set of transmission formats to each node of the at least one resource tree, with the transmission format including information such as the number of information bits, the coding scheme, the coding rate, and the modulation scheme. In this case, after receiving the data, the receiver may decode the received data by recursively applying a set of resource allocation schemes that are represented by respective nodes in the at least one resource tree, and recursively applying the set of transmission formats in each node, until the data is decoded.

The method may further contemplates assigning a set of control channel messages to each node of the at least one resource tree, with the control channel message comprising down link single input single output grant, downlink multiple input multiple output grant, uplink single input single output grant, and uplink multiple input multiple output grant.

According to another aspect of the present invention, a transmitter for transmitting data may be constructed with a modulator for modulating data to be transmitted into a plurality of modulated symbols, a storing unit for storing resource elements in at least one resource tree configurations, with each resource tree comprising a plurality of nodes comprising a root node and at least one leaf node, linked by zero, one or more inner nodes, a plurality of resource elements being mapped into respective leaf nodes in the at least one resource tree according to a certain mapping scheme, and each node in the at least one resource tree representing a resource allocation scheme for data transmission, a resource selection unit for selecting a resource allocation scheme from among the plurality of resource allocation schemes represented by the nodes of the at least one resource tree, and a front end processing unit for processing the plurality of modulated symbols according to the selected resource allocation scheme and transmitting the plurality of processed modulated symbols.

According to still another aspect of the present invention, a receiver for receiving data may be constructed with a front end processing unit for receiving data symbols, a storing unit for storing resource elements in at least one resource tree configurations, with each resource tree comprising a plurality of nodes comprising a root node and at least one leaf node, linked by zero, one or more inner nodes, a plurality of resource elements being mapped into respective leaf nodes in the at least one resource tree according to a certain mapping scheme, and each node in the at least one resource tree representing a resource allocation scheme for data transmission, and a decoder for decoding the received data by recursively applying a resource allocation scheme represented by the nodes in the resource trees stored in the storing unit until the data is decoded.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 16c is an illustrations of a subtree in a single resource tree constructed when CCFI indicates 3 OFDM symbols, according to a seventh embodiment of the principles of the present invention;

FIG. 19 is an illustration of a transmitter constructed as an embodiment according to the principles of the present invention; and FIG. 20 is an illustration of a receiver constructed as an embodiment according to the principles of the present invention.

DETAILED DESCRIPTION OF THE INVENTION

Figure 1:
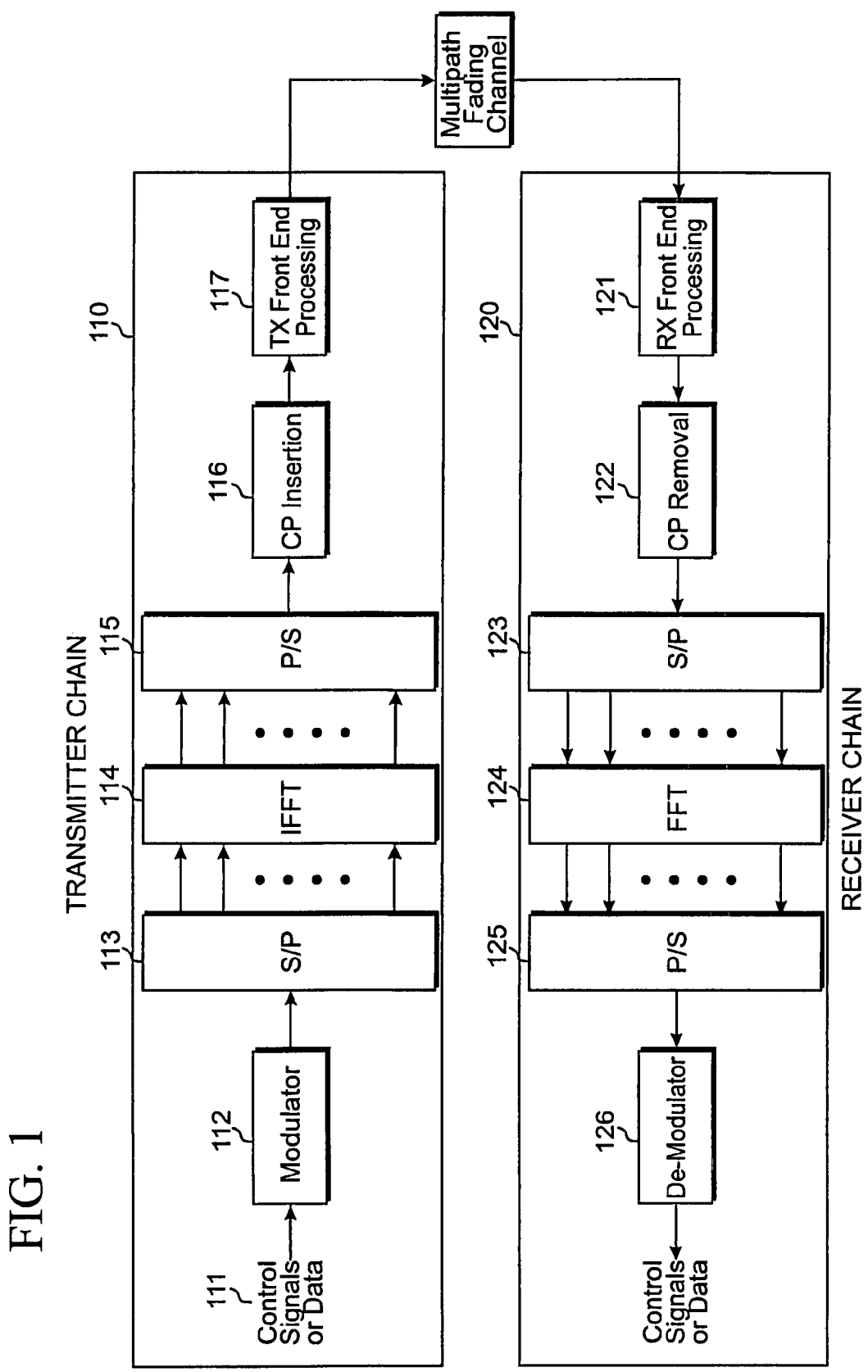
FIG. 1 is an illustration of an Orthogonal Frequency Division Multiplexing (OFDM) transceiver chain suitable for the practice of the principles of the present invention.

FIG. 1 illustrates an Orthogonal Frequency Division Multiplexing (OFDM) transceiver chain. In a communication system using OFDM technology, at transmitter chain 110, control signals or data 111 is modulated by modulator 112 into a series of modulated symbols, that are subsequently serial-to-parallel converted by Serial/Parallel (S/P) converter 113. Inverse Fast Fourier Transform (IFFT) unit 114 is used to transfer the signals from frequency domain to time domain into a plurality of OFDM symbols. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

Figure 2:
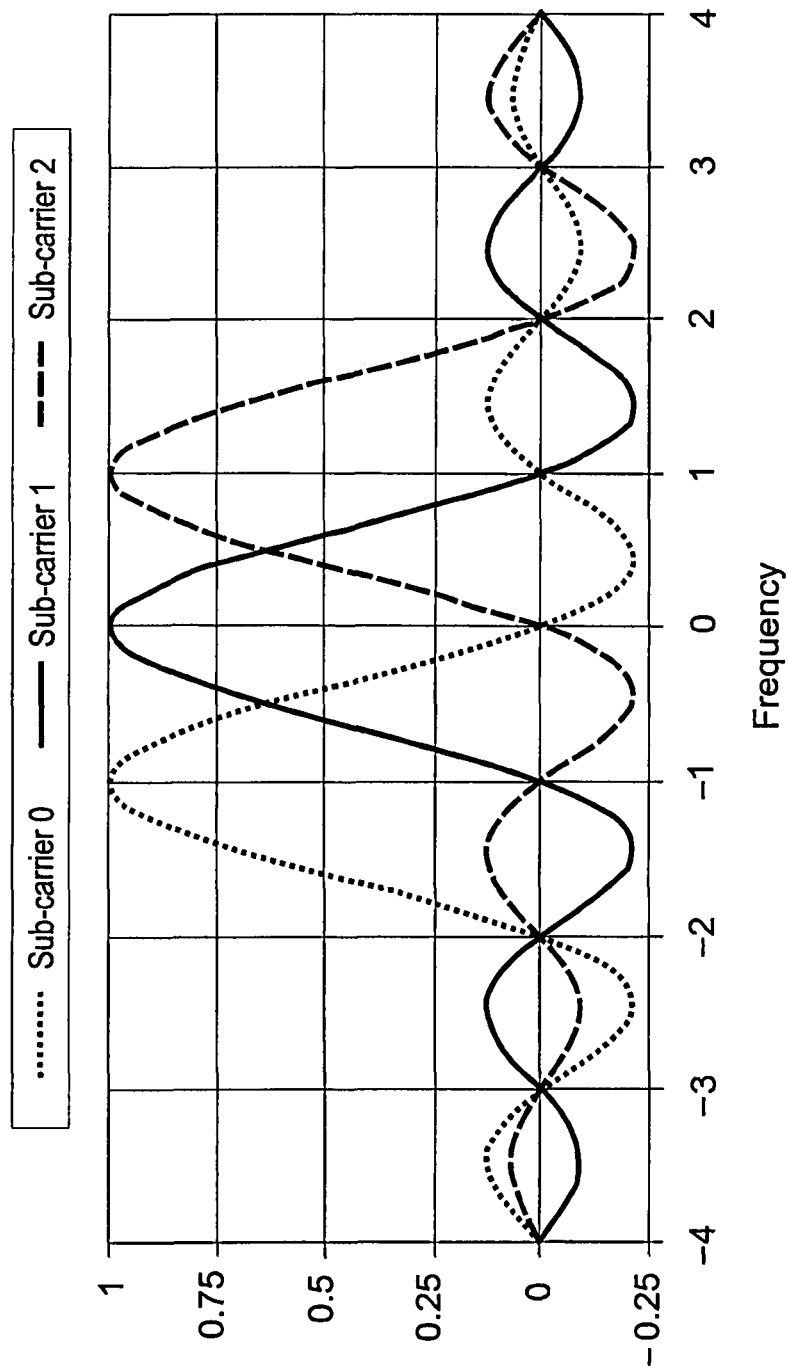
FIG. 2 is an illustration of OFDM subcarriers.

FIG. 2 illustrates the OFDM transmission scheme using sub-carrier 1, sub-carrier 2, and sub-carrier 3. Because each OFDM symbol has finite duration in time domain, the sub-carriers overlap with each other in frequency domain. The orthogonality is maintained at the sampling frequency assuming the transmitter and the receiver has perfect frequency synchronization, as shown in FIG. 2. In the case of frequency offset due to imperfect frequency synchronization or high mobility, the orthogonality of the sub-carriers at sampling frequencies is destroyed, resulting in inter-carrier-interference (ICI).

Figure 3:
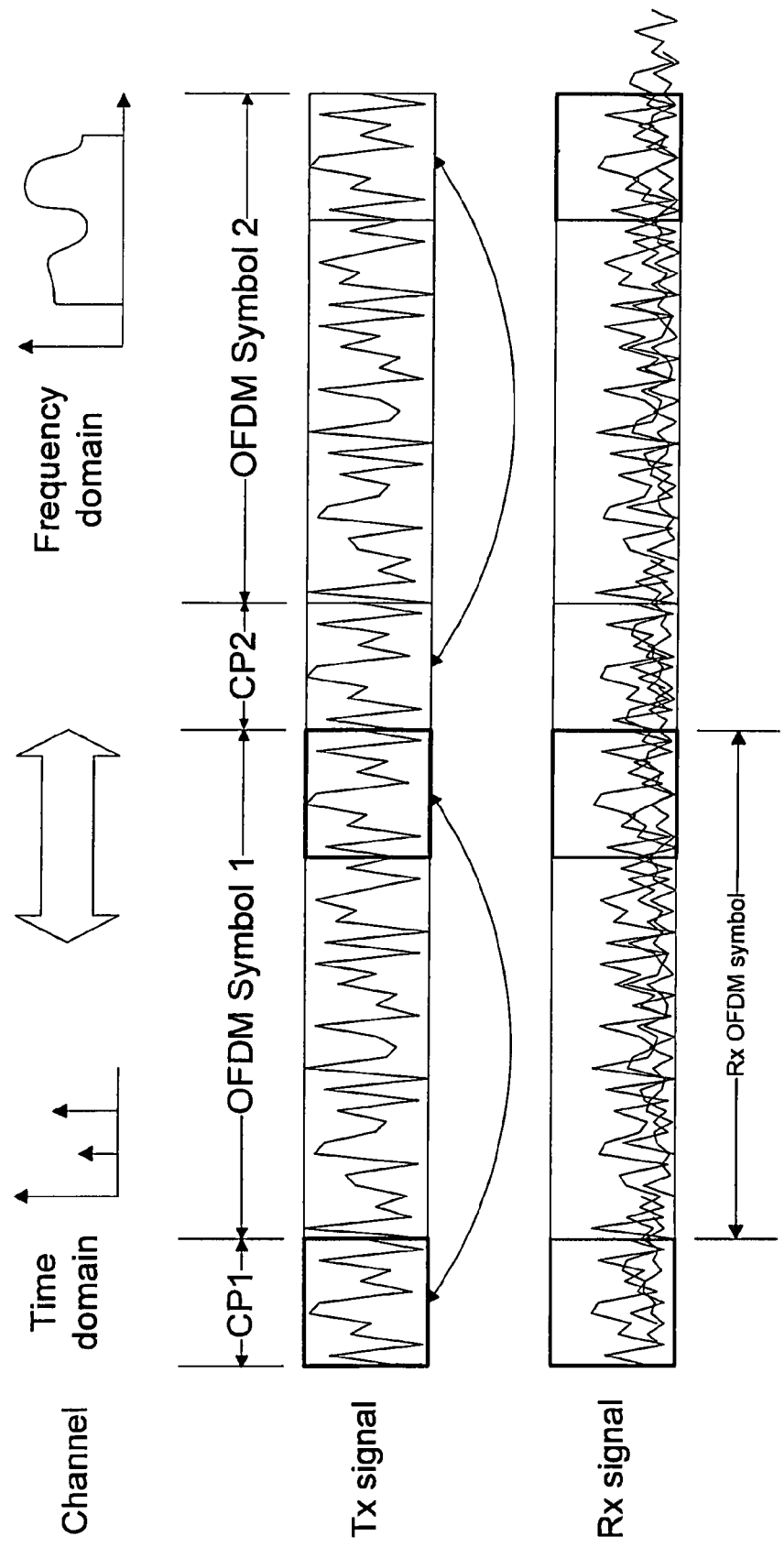
FIG. 3 is an illustration of OFDM symbols in a time domain.

A time domain illustration of the transmitted and received OFDM symbol is shown in FIG. 3. Due to multipath fading, the CP portion of the received signal is often corrupted by the previous OFDM symbol. As long as the CP is sufficiently long, however, the received OFDM symbol without CP should only contain its own signal convoluted by the multi-path fading channel. In general, a Fast Fourier Transform (FFT) is taken at the receiver side to allow further processing in frequency domain. The advantage of OFDM over other transmission schemes is its robustness to multipath fading. The multipath fading in time domain translates into frequency selective fading in frequency domain. With the cyclic prefix or zero prefix added, the inter-symbol-interference between adjacent OFDM symbols are avoided or largely alleviated. Moreover, because each modulation symbol is carried over a narrow bandwidth, it experiences a single path fading. Simple equalization scheme can be used to combat frequency selection fading.

Figure 4:
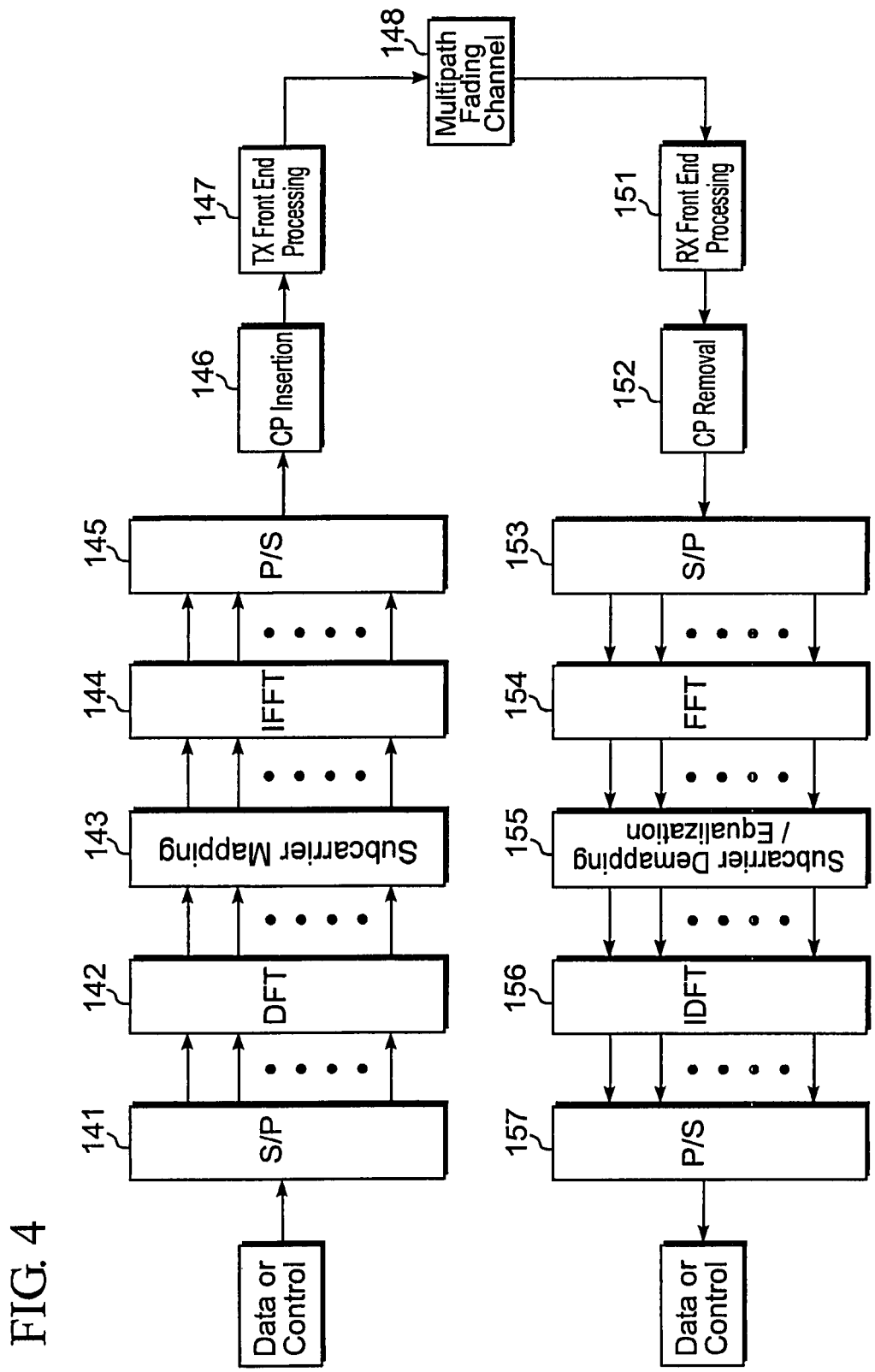
FIG. 4 is an illustration of single carrier frequency division multiple access transceiver chain.

Single carrier frequency division multiple access (SC-FDMA), which utilizes single carrier modulation and frequency domain equalization is a technique that has similar performance and complexity as those of an OFDMA system. One advantage of SC-FDMA is that the SC-FDMA signal has lower peak-to-average power ratio (PAPR) because of its inherent single carrier structure. Low PAPR normally results in high efficiency of power amplifier, which is particularly important for mobile stations in uplink transmission. SC-FDMA is selected as the uplink multiple access scheme in 3GPP long term evolution (LTE). An example of the transceiver chain for SC-FDMA is shown in FIG. 4. At the transmitter side, the data or control signal is serial to parallel (S/P) converted by a S/P converter 141. Discrete Fourier transform (DFT) will be applied to time-domain data or control signal by a DFT transformer 142 before the time-domain data is mapped to a set of sub-carriers by a sub-carrier mapping unit 143. To ensure low PAPR, normally the DFT output in the frequency domain will be mapped to a set of contiguous sub-carriers. Then IFFT, normally with larger size than the DFT, will be applied by an IFFT transformer 144 to transform the signal back to time domain. After parallel to serial (P/S) convention by a P/S/converter 145, cyclic prefix (CP) will be added by a CP insertion unit 146 to the data or the control signal before the data or the control signal is transmitted to a transmission front end processing unit 147. The processed signal with a cyclic prefix added is often referred to as a SC-FDMA block. After the signal passes through a communication channel 148, e.g., a multipath fading channel in a wireless communication system, the receiver will perform receiver front end processing by a receiver front end processing unit 151, remove the CP by a CP removal unit 152, apply FFT by a FFT transformer 154 and frequency domain equalization. Inverse Discrete Fourier transform (IDFT) 156 will be applied after the equalized signal is demapped 155 in frequency domain. The output of IDFT will be passed for further time-domain processing such as demodulation and decoding.

In packet-based wireless data communication systems, control signals transmitted through control channels, i.e., control channel transmission, generally accompany data signals transmitted through data channels, i.e., data transmission. Control channel information, including control channel format indicator (CCFI), acknowledgement signal (ACK), packet data control channel (PDCCH) signal, carries transmission format information for the data signal, such as user ID, resource assignment information, Payload size, modulation, Hybrid Automatic Repeat-reQuest (HARQ) information, MIMO related information.

Figure 5:
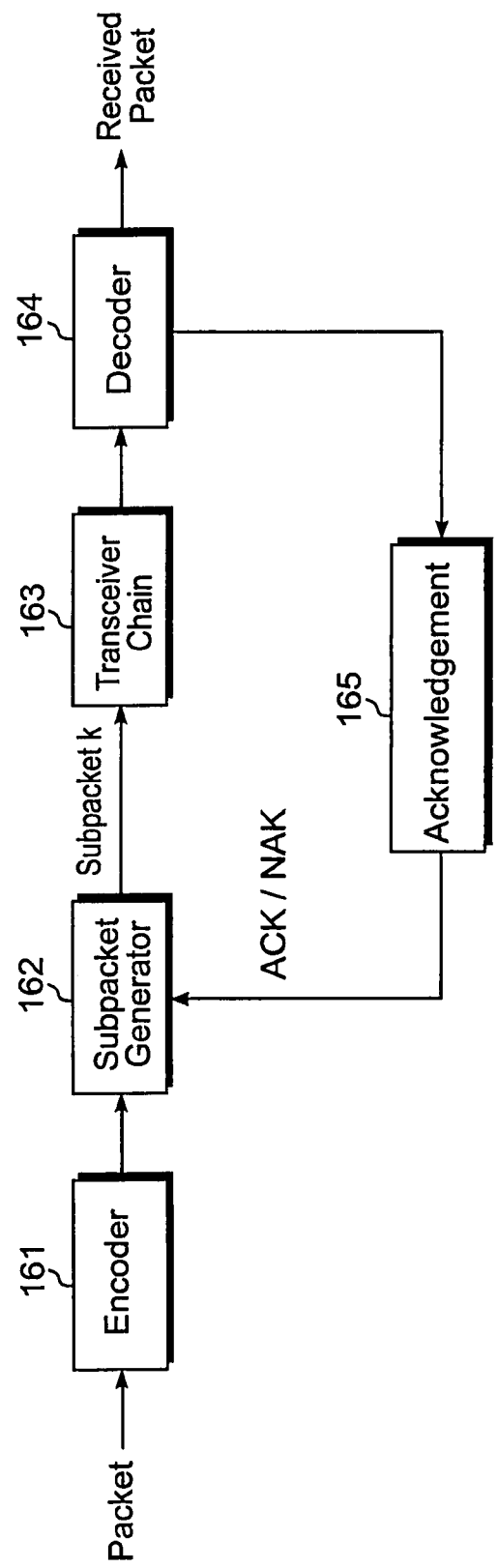
FIG. 5 is an illustration of a Hybrid Automatic Repeat request (HARQ) transceiver chain.

Hybrid Automatic Repeat reQuestion (HARQ) is widely used in communication systems to combat decoding failure and improve reliability. As shown in FIG. 5, each data packet is coded by an encoder 161 using certain forward error correction (FEC) scheme. Subpackets are generated by a sub-packet generator 162. Each subpacket may only contains a portion of the coded bits. If the transmission for a subpacket k fails, as indicated by a NAK in a feedback acknowledgement channel 165, a retransmission subpacket, subpacket k+1, is transmitted to help the receiver decode the packet. The retransmission subpackets may contain different coded bits than the previous subpackets. The receiver may softly combine or jointly decode all the received subpackets by a decoder 164 to improve the chance of decoding. Normally, a maximum number of transmissions is configured in consideration of both reliability, packet delay, and implementation complexity.

Figure 6:
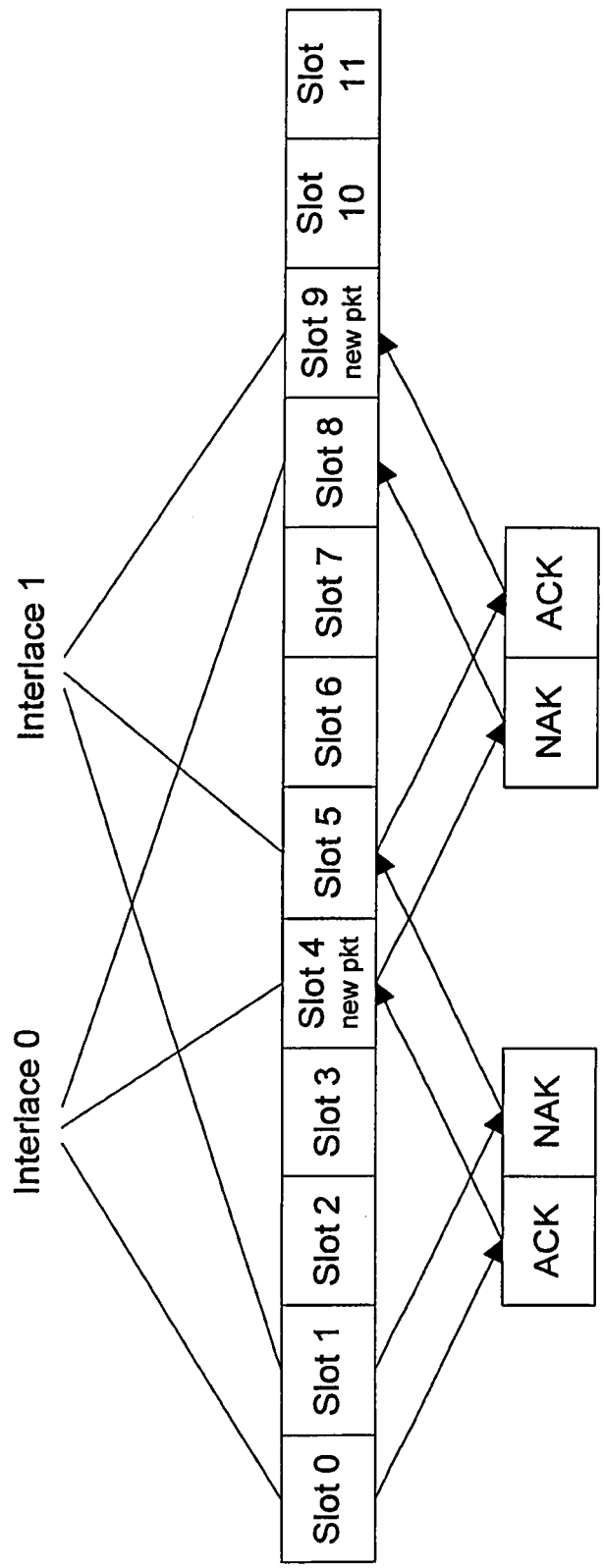
FIG. 6 is an illustration of a four-channel HARQ transmission scheme.

Due to its simplicity, N-channel synchronous HARQ are often used in wireless communication systems. For example, synchronous HARQ has been accepted as the HARQ scheme for LTE uplink in 3GPP. FIG. 6 shows an example of a four-channel synchronous HARQ. Due to fixed timing relationship between subsequent transmissions, the transmission slots in the same HARQ channel exhibits an interlace structure. For example, interlace 0 consists of slot 0, 4, 8, . . . , 4k, . . . ; interlace 1 consists of slot 1, 5, 9, . . . , 4k+1, . . . ; interlace 2 consists of slot 2, 6, 10, . . . , 4k+2, . . . ; interlace 3 consists of slot 3, 7, 11, . . . 4k+3, . . . Let's take interlace 0 as an example. A sub-packet is transmitted in slot 0. After correctly decoding the packet, the receiver sends back an ACK to the transmitter. The transmitter then can start a new packet at the next slot in this interlace, i.e., slot 4. The first subpacket transmitted in slot 4 is, however, not correctly received. After the transmitter receives the NAK from the receiver, the transmitter transmits another sub-packet of the same packet at the next slot in this interlace, i.e., slot 8. Sometimes a receiver might have difficulty in detecting the packet boundary, i.e., whether a subpacket is the first sub-packet of a new packet or a retransmission sub-packet. To alleviate this problem, a new packet indicator may be transmitted in the control channel that carries transmission format information for the packet. Sometimes, a more elaborated version of HARQ channel information, such as sub-packet ID, or even HARQ channel ID, can be transmitted to help the receiver detect and decode the packet.

Figure 7:
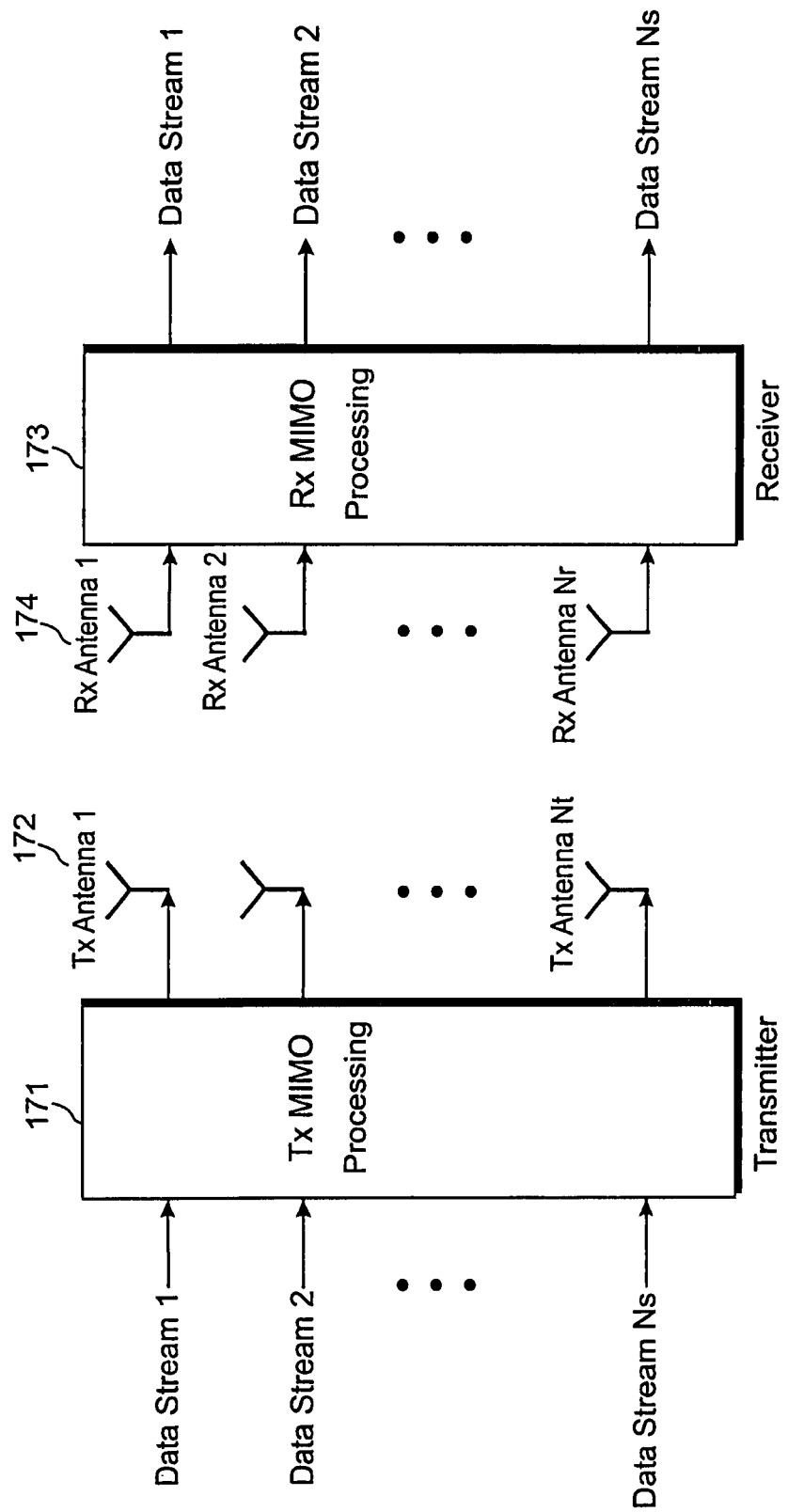
FIG. 7 is an illustration of a Multiple Input Multiple Output (MIMO) system.

Multiple antenna communication systems, which is often referred to as multiple input multiple output (MIMO), are widely used in wireless communication to improve system performance. In a MIMO system as shown in FIG. 7, transmitter 171 has multiple transmission antennas 172 capable of transmitting independent signals and receiver 173 is equipped with multiple reception antennas 174. MIMO systems degenerates to single input multiple output (SIMO) if there is only one transmission antenna or if there is only one stream of data transmitted. MIMO systems degenerates to multiple input single output (MISO) if there is only one receive antenna. MIMO systems degenerates to single input single output (SISO) if there is only one transmission antenna and one receive antenna. MIMO technology can significant increase throughput and range of the system without any increase in bandwidth or overall transmit power. In general, MIMO technology increases the spectral efficiency of a wireless communication system by exploiting the additional dimension of freedom in the space domain due to multiple antennas. There are many categories of MIMO technologies. For example, spatial multiplexing schemes increase the transmission rate by allowing multiple data streaming transmitted over multiple antennas. Transmit diversity methods such as space-time coding take advantage of spatial diversity due to multiple transmit antennas. Receiver diversity methods utilizes the spatial diversity due to multiple receive antennas. Beamforming technologies improve received signal gain and reducing interference to other users. Spatial division multiple access (SDMA) allows signal streams from or to multiple users to be transmitted over the same time-frequency resources. The receivers can separate the multiple data streams by the spatial signature of these data streams. Note these MIMO transmission techniques are not mutually exclusive. In fact, many MIMO schemes are often used in an advanced wireless systems.

Figure 8:
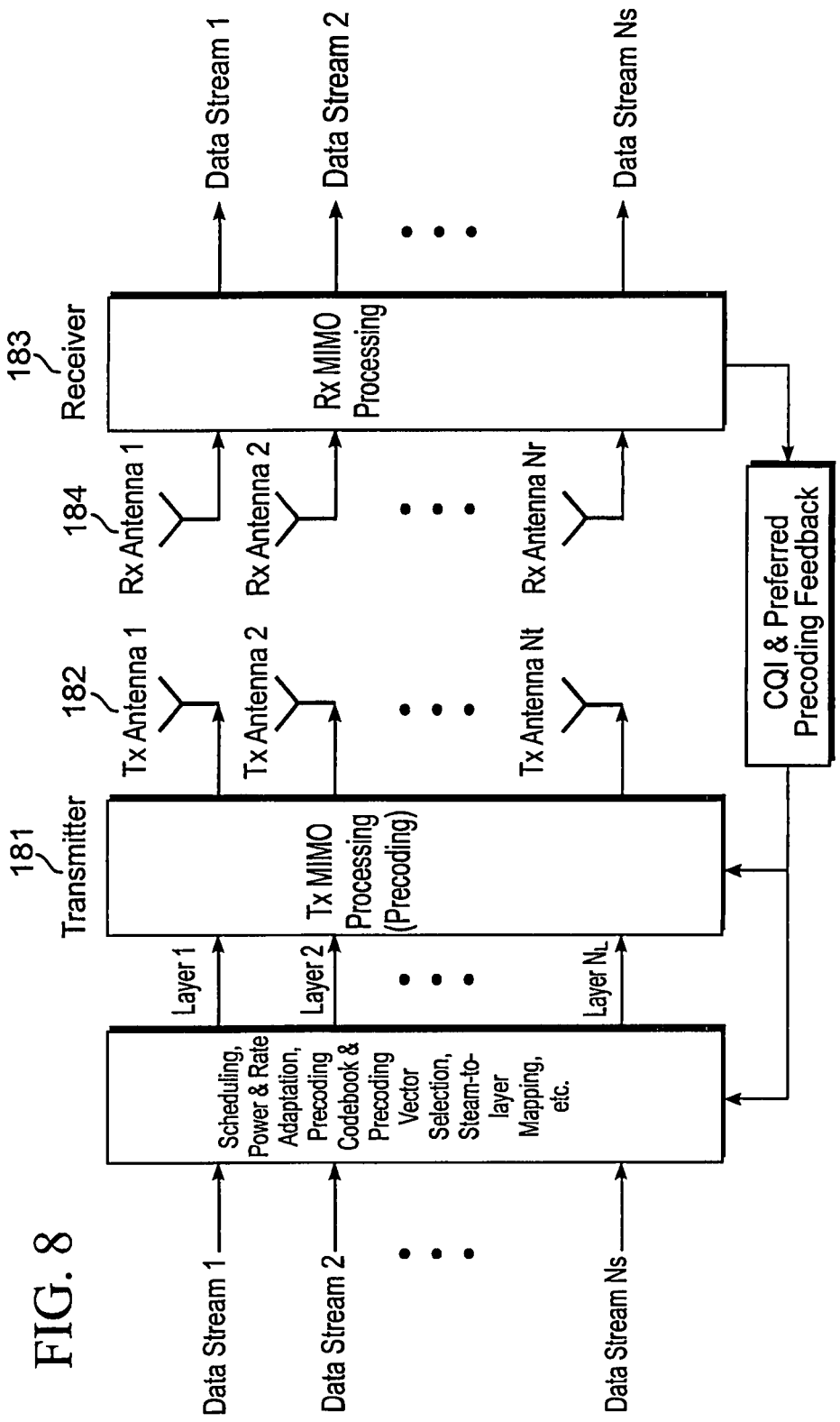
FIG. 8 is an illustration of a precoded MIMO system.

When the channel is favorable, e.g., the mobile speed is low, it is possible to use closed-loop MIMO scheme to improve system performance. In a closed-loop MIMO system as shown FIG. 8, receiver 183 sends feedback information regarding the channel condition and/or preferred Tx MIMO processing schemes. Transmitter 181 utilizes this feedback information, together with other considerations such as scheduling priority, data and resource availability, to jointly optimize the transmission scheme. A popular closed loop MIMO scheme is called MIMO preceding. With preceding, the transmit data streams are pre-multiplied by a matrix before being passed on to the multiple transmit antennas. As shown in FIG. 8, assume there are Nt transmit antennas and Nr receive antennas. Denote the channel between the Nt transmit antennas and the Nr receive antennas as H. Therefore H is an Nt×Nr matrix. If the transmitter has knowledge about H, the transmitter can choose the most advantageous transmission scheme according to H. For example, if maximizing throughout is the goal, the precoding matrix can be chosen to be the right singular matrix of H, if the knowledge of H is available at the transmitter. By doing so, the effective channel for the multiple data streams at the receiver side can be diagonalized, eliminating the interference between the multiple data streams. The overhead required to feedback the exact value of H, however, is often prohibitive. In order to reduce feedback overhead, a set of preceding matrices are defined to quantize the space of the possible values that H could substantiate. With the quantization, a receiver feeds back the preferred precoding scheme, normally in the form of the index of the preferred precoding matrix, the rank, and the indices of the preferred precoding vectors. The receiver may also feed back the associated CQI values for the preferred precoding scheme.

Another perspective of a MIMO system is whether the multiple data streams for transmission are encoded separately or encoded together. If all the layers for transmission are encoded together, we call it a single codeword (SCW) MIMO system. And we call it a multiple codeword (MCW) MIMO system otherwise. In the LTE downlink system, when single user MIMO (SU-MIMO) is used, up to 2 codewords can be transmitted to a single UE. In the case that 2 codewords are transmitted to a UE, the UE needs to acknowledge the two codewords separately. Another MIMO technique is called spatial division multiple access (SDMA), which is also referred to as multi-user MIMO (MU-MIMO) sometimes. In SDMA, multiple data streams are encoded separately and transmitted to different intended receivers on the same time-frequency resources. By using different spatial signature, e.g., antennas, virtual antennas, or precoding vectors, the receivers will be able to distinguish the multiple data streams. Moreover, by scheduling a proper group of receivers and choosing the proper spatial signature for each data stream based on channel state information, the signal of interest can be enhanced while the other signals can be enhanced for multiple receivers at the same time. Therefore the system capacity can be improved. Both single user MIMO (SU-MIMO) and multi-user MIMO (MU-MIMO) are adopted in the downlink of LTE. MU-MIMO is also adopted in the uplink of LTE while SU-MIMO for LTE uplink is still under discussion.

Figure 9:
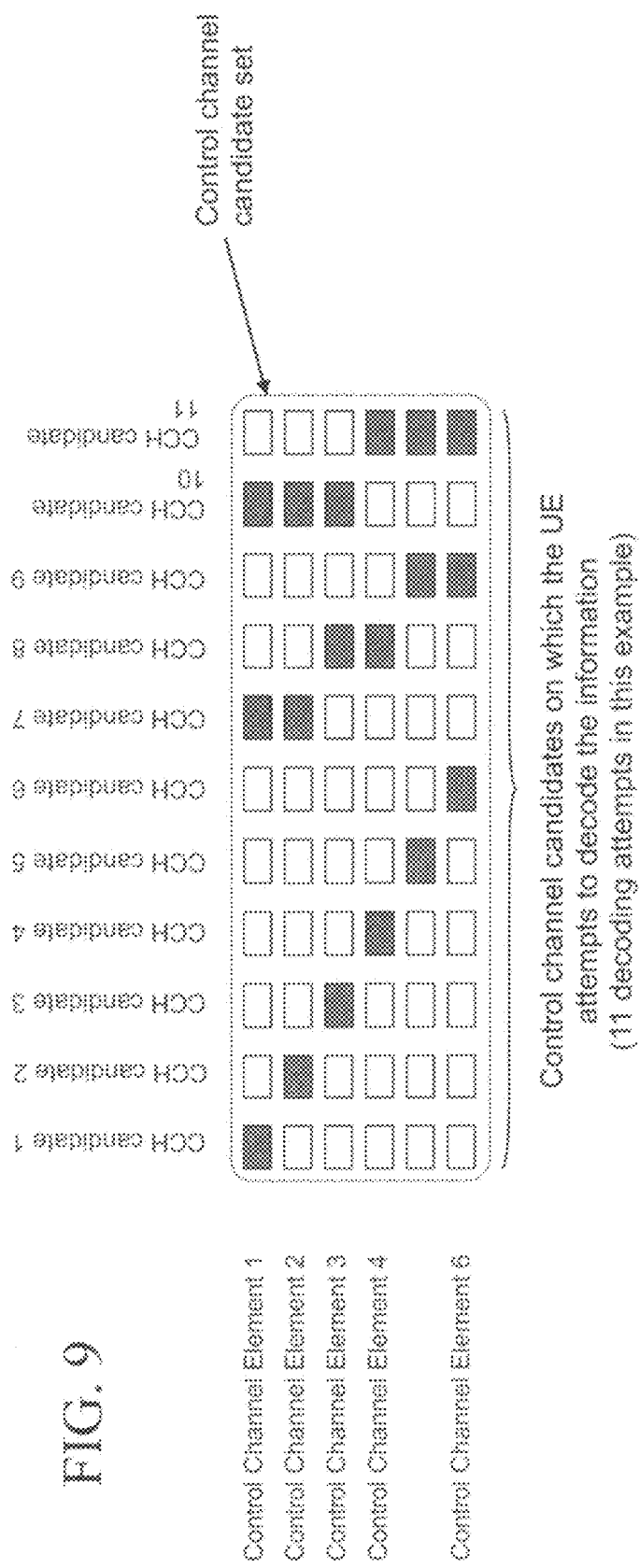
FIG. 9 is an illustration of LTE downlink control channel elements.

In LTE systems, some resource elements, namely control channel elements (CCE), are reserved for downlink control channel transmission. Control channel (CCH) candidate set can be constructed based on the control channel elements reserved for downlink control channel transmission. Each downlink control channel can be transmitted on one of the control channel candidate set. An example of control channel elements and control channel candidate set is shown in FIG. 9. In this example, eleven control channel candidate sets can be constructed on six control channel elements. CCH candidate set 1 is constructed with CCE 1; CCH candidate set 2 is constructed with CCE 2; CCH candidate set 3 is constructed with CCE 3; CCH candidate set 4 is constructed with CCE 4; CCH candidate set 5 is constructed with CCE 5; CCH candidate set 6 is constructed with CCE 6; CCH candidate set 7 is constructed with CCEs 1 and 2; CCH candidate set 8 is constructed with CCEs 3 and 4; CCH candidate set 9 is constructed with CCEs and 6; CCH candidate set 10 is constructed with CCEs 1, 2 and 3; CCH candidate set 11 is constructed with CCEs 4, 5 and 6. In the rest of the document, we will refer to these control channel candidate sets as control channel resource sets, or simply, resource sets.

Typically, the user equipment (UE) will monitor all the eligible resource sets to find the control channel message that is addressed to the UE. This requires the UE to blindly decode a large number of resource sets, with possibly multiple blind decoding on each resource set because of multiple possible transmission formats. Blind decoding means that the receiver (i.e., the UE) does not have exact knowledge of which resource set (i.e., control channel resource set) was allocated for control channel transmission. The receiver knows, however, that the control channel transmission uses one of the possible resource sets. For example, in the LTE downlink system as shown in FIG. 9, the receiver does not know which CCH candidate set among CCH candidate sets 1 through 11 was used. The receiver only knows that the control channel transmission uses one set selected from CCH candidate sets 1 through 11. Therefore, the receiver attempts to decode the received control channel signal recursively using one of the possible resource sets. If the decoding is successful, the receiver processes the received data using the information derived from the decoding. If the decoding is unsuccessful, the receiver proceeds to another decoding attempt of the control signal using another possible resource set, until the control channel is decoded successfully or some stopping criteria, e.g., exhausting all possible resource sets for the control signal, is met. For example, as shown in FIG. 9, the receiver will recursively decodes the received control signal by applying all of the possible resource sets, i.e., CCH candidate sets 1 through 11, until the received control signal decodes. By doing so, the signaling of the transmission format is omitted at the expense of increased decoding complexity at the receiver side. The overall amount of blind decoding can be large at the UE.

Figure 10:
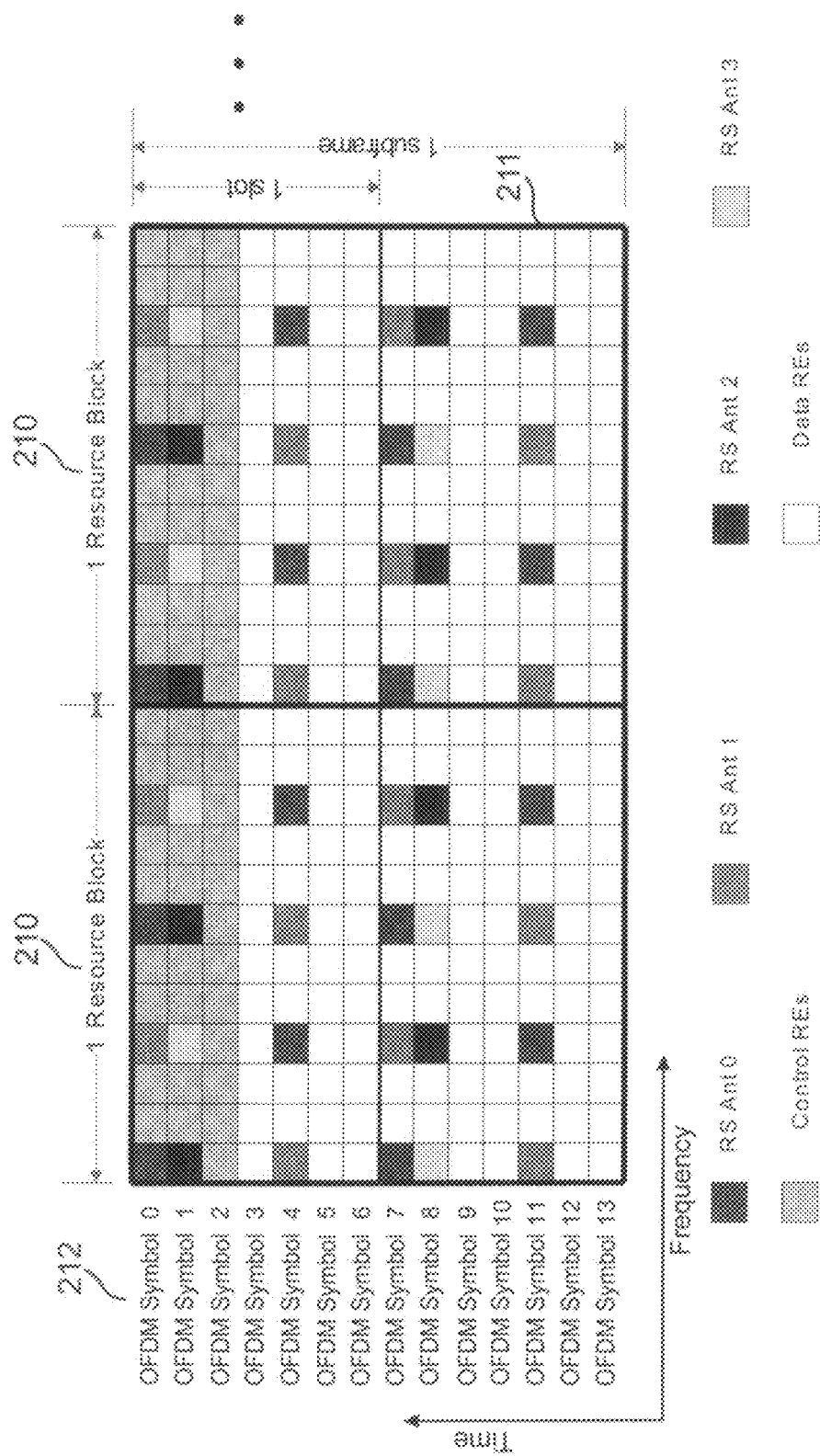
FIG. 10 is an illustration of LTE downlink subframe structure.

The downlink subframe structure in a 3GPP LTE system is shown in FIG. 10. In the 3GPP LTE system, a time and frequency resource can be divided into a plurality of resource blocks 210 (RB). Each resource block 210 can be further divided into a plurality of resource elements 211 in a time and frequency domain. As shown in FIG. 10, a single OFDM symbol can be transmitted using a row of resource elements corresponding to the same period of time. In a typical configuration, each subframe is 1 ms long, containing 14 OFDM symbols. Assume the OFDM symbols in a subframe are indexed from 0 to 13. Reference symbols (RS) for antenna 0 and 1 are located in OFDM symbol 0, 4, 7, and 11. If present, reference symbols (RS) for antennas 2 and 3 are located in OFDM symbol 2 and 8. Control channel signals, including Control Channel Format Indicator (CCFI), acknowledgement signal (ACK), packet data control channel (PDCCH) signal, are transmitted in the first one, or two, or three OFDM symbols. The number of OFDM symbols used for control channel signals is indicated by CCFI. Data channel signals, i.e., Physical Downlink Shared Channel (PDSCH) signals, are transmitted in other OFDM symbols.

In this invention, we propose methods and apparatus to map control channel resources in OFDM systems.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the FIGS. of the accompanying drawings. In the following illustrations, we use the downlink control channels in 3GPP LTE system as an example. However, the techniques illustrated here can certainly be applied to uplink control channels, downlink and uplink data channels, and in other channels and systems whenever applicable.

Figure 11:
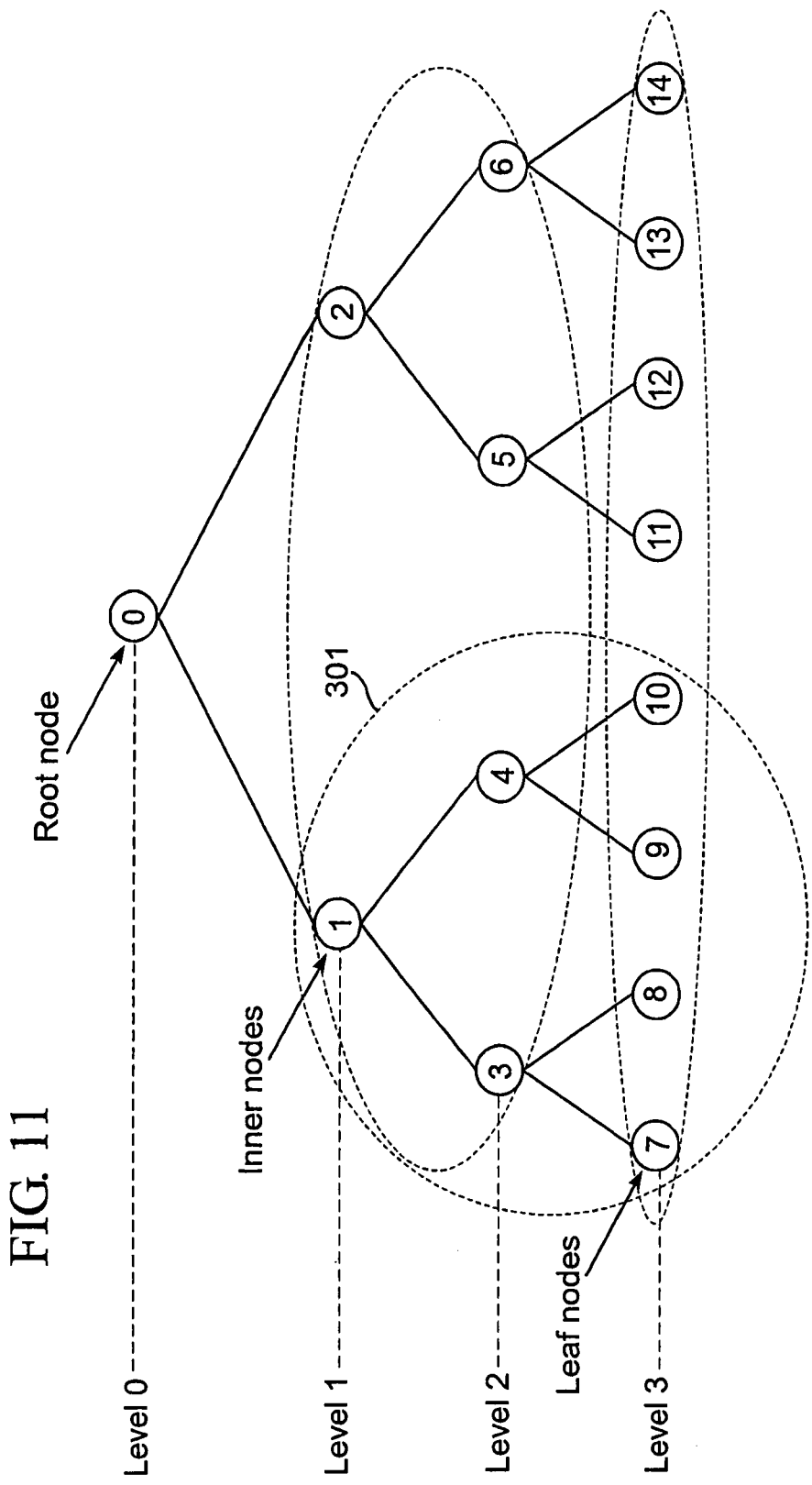
FIG. 11 is an illustration of a rooted binary tree.

The description of this invention uses a tree structure for illustration purpose. A resource tree structure emulates the shape of a tree. The resource tree is constructed with one or multiple nodes and branches. If there are multiple nodes, the nodes may be linked through branches. FIG. 11 shows an example of a rooted binary tree. The nodes are indexed from 0 to 14. Each node in the tree may be linked to one or more nodes immediately beneath the node (referred to as "child" nodes). In addition, each node may be connected to one node immediately above the node (referred to as a "parent" node). Each node has zero or more child nodes. A binary tree is a tree in which every node has at most two child nodes. In FIG. 11, for example, Node 1 and Node 2 are child nodes of Node 0. Conversely, Node 0 is the parent node of Node 1 and Node 2. A node has at most one parent node. Not all nodes have child node. For example, Node 7 has no child node. A node without a child node is defined as a leaf node. In FIG. 11, Nodes 7 through 14 are leaf nodes. If the parent node of a first node is a child of a second node, then the first node is a descendant of the second node and the second node is an ancestor of the first node. Similarly, this relationship can be extended for multiple levels. In other words, if the ancestor of a first node is a child of a second node, then the first node is also a descendant of the second node and the second node is also an ancestor of the first node. Note that a parent node is a special case of an ancestor node and a child node is a special case of a descendant node. A parent node is an immediate ancestor node. A child node is an immediate descendant node. In FIG. 11, for example, Nodes 3, 1, and 0 are the ancestors of Node 7; Nodes 1 through 14 are the descendants of Node 0. We designate a node with no ancestor as a root node. We also call a tree with a root node a rooted tree. In this example, Node 0 is the root node of this tree. A node that is neither a root node nor a leaf node is called an inner node. In FIG. 11, Nodes 1 through 6 are inner nodes. A subtree is a portion of a tree that can be viewed as a complete tree by itself. For example, subtree 301 in FIG. 11 includes Node 1 and all the descendents of Node 1. We also define levels in a tree as a relationship between an inner node or a leaf node and a root node. A tree has at least one level. In FIG. 11, Node 0 corresponds to level 0; Nodes 1 and 2 correspond to level 1; Nodes 3 through 6 correspond to level 2; and Nodes 7 through 14 correspond to level 3.

For illustration purpose, the description of this invention is based on the concept of resource trees. Take the 3GPP LTE system for example, the resource elements allocated for downlink control channel transmission are grouped into a plurality of control channel elements (CCE). Each CCE has equal, or roughly equal, number of resource elements (RE). For example, assume there are fourteen CCEs allocated for control channel transmission. As shown in FIG. 12, a resource tree can be constructed by using these fourteen CCEs as base nodes, or leaf nodes. In the present invention, we use binary trees as examples of resource trees. One can, however, certainly uses other trees in which nodes may have more than two child nodes without departing from the scope of the invention.

Figure 12A:
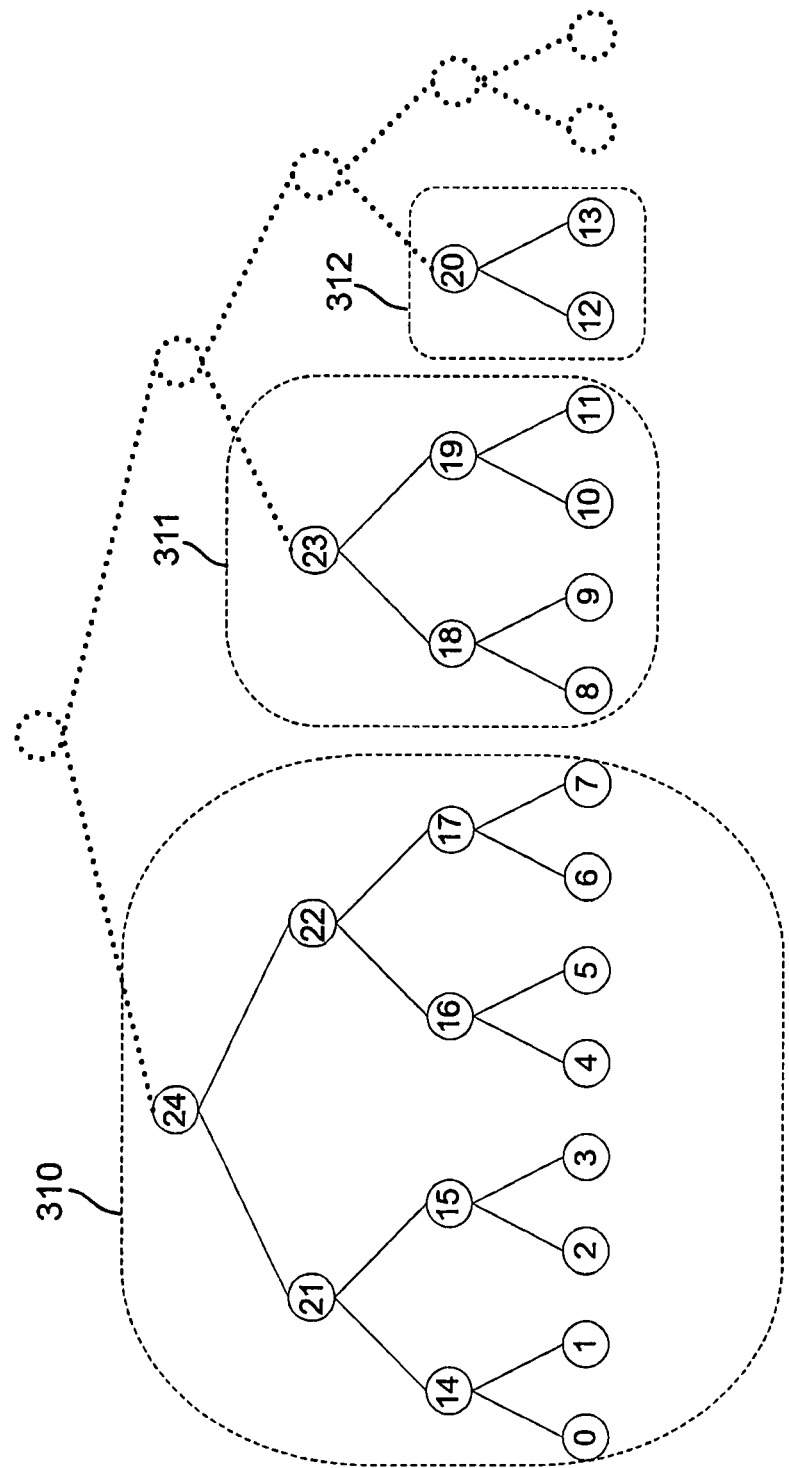
FIG. 12a is an illustration of multiple resource trees constructed as a first embodiment according to the principles of the present invention.

In a first embodiment according to the principles of the present invention, a graph with multiple rooted trees is constructed with at least one leaf node representing one resource element that may be allocated for control channel transmission, and at least one inner node or root node representing the set of resource elements that may be allocated for control channel transmission, the set of resource elements being represented by the leaf nodes that are descendants of the inner node or the root node. These trees are used in resource allocation and blind decoding of the control channels. As an example, in FIG. 12, the leaf nodes are indexed from 0 to 13. Using a binary tree construction, we can construct a graph with three rooted binary trees as shown in FIG. 12A. The three trees are tree 310 with Node 24 as a root node, tree 311 with Node 23 as a root node, and tree 312 with Node 20 as a root node. Each leaf node corresponds to a physical control channel element (CCE), i.e., a resource element. Each inner node or root node represents a set of physical CCEs that are represented by the corresponding leaf nodes that are descendents of that inner node or root node. For example, Node 2 represents CCE 2, Node 3 represents CCE 3, and Node 15 represents a combination of CCE 2 and CCE 3. This tree structure allows efficient resource allocation for control channel transmission. For example, if one control channel transmission needs two CCEs, Node 15 can be assigned to this control channel transmission, meaning both CCE 2 and CCE 3 are used for transmitting this control channel. Similarly, any one of Nodes 14, 16, 17, 18, 19 and 20 may be assigned to the control channel transmission which requires two CCEs. Therefore, by broadcasting the tree structures or information based on which the receiver constructs the tree structures before any data is transmitted, the receiver does not have to know the information regarding the resource allocation for the data transmission. This can greatly reduce the signaling complexity of resource allocation for control channel transmission, compare to the contemporary technique where information regarding the resource allocation for control channel transmission needs to be signaled every time the data is transmitted.

In the case that the receiver uses blind decoding to detect the resource allocation, this tree structure can greatly reduce the number of blind decoding required. That is, the present invention reduces the number of possible sets of resource elements for a receiver to try by limiting the possible combination of control channel elements to only the ones corresponding to a node in the tree. For example, with 8 control channel elements, the total number of all possible combination would be $2^8-1=255$. Therefore, if control channel elements are not mapped the tree structure according to the principles of the present invention, the receiver may need to try all (or a large portion) of the possible combinations until the received data decodes. With the tree construction, for example the tree with root Node 24, the number of possible combinations reduces to 15. Specifically, the possible combinations are: Node 0, Node 1, Node 2, Node 3, Node 4, Node 5, Node 6, Node 7, Node 14, Node 15, Node 16, Node 17, Node 21, Node 22 and Node 24. Therefore, the receiver only needs to try 15 possible combinations until the received data decodes.

Figure 12B:
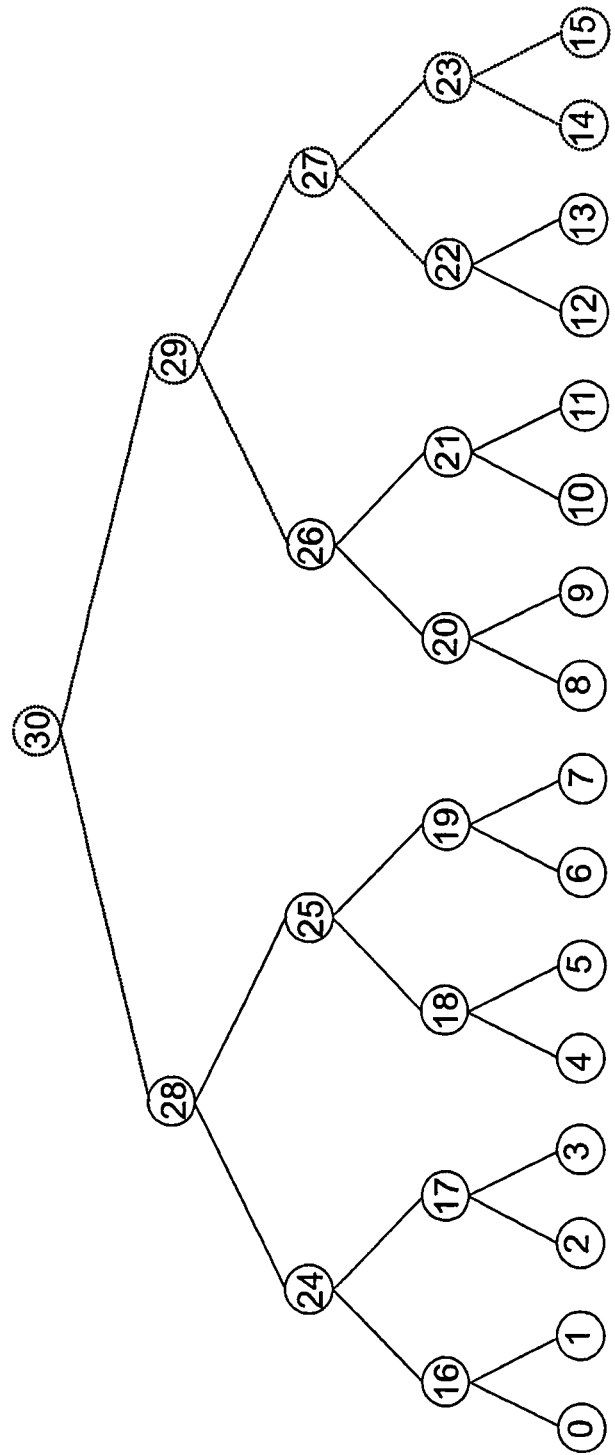
FIG. 12b is an illustration of a single resource tree constructed as a second embodiment according to the principles of the present invention.

In a second embodiment according to the principles of the invention, a graph with one rooted tree is constructed where at least one leaf node represents one resource element and at least at least one leaf node does not represent any resource element. For example, we can construct one binary tree as shown in FIG. 12B with Node 30 as its root node. Note that in this tree, there is no resource element corresponding to either one of Nodes 14, 15, and 23. Similarly, some of the leaf nodes below Nodes 27, 29, and 30 have no resource elements corresponding to them. Preferably, Nodes 14, 15, and 23 can be reserved or be used to indicate either no resource allocation or some other purpose. Nodes 27, 29, and 30, however, can still be used. For example, a resource allocation with Node 29 to a control channel may mean the physical CCEs that represented by node 8, 9, 10, 11, 12, 13 are used for that control channel.

It is assumed that there is a control channel element indexing scheme. Both the tree node indexing scheme and the control channel element indexing scheme should be specified in a standard which may be initially set up. In addition, the mapping from the leaf nodes to the control channel elements may also be specified in the standard. By doing so, transmitters and receivers can derive the tree, the control channel indices, and the mapping from control channel elements to the leaf nodes based on minimum signaling, e.g., the size of the tree or the number of available control channel elements.

The indexing scheme in FIG. 12A may require less signaling overhead or less blind decoding than the indexing scheme in FIG. 12B, while the indexing scheme in FIG. 12B allows more flexibility in resource allocation than FIG. 12A. Specifically, Node 29 in FIG. 12B is one possible resource allocation scheme, i.e., a possible combination of control channel elements represented by Nodes 8 through 13. Therefore, when using a resource tree as illustrated in FIG. 12B, the receiver has to try to decode the received data by using the possible resource allocation scheme represented by Node 29. In contract, in FIG. 12A, because there is no Node 29, the receiver does not have to try to decode the received data by using the possible resource allocation scheme represented by Node 29.

In a preferred embodiment, the size of the tree or the number of available control channel elements may be indicated by the Control Channel Format Indicator (CCFI). Normally, CCFI carries information to indicate how many OFDM symbols are used for control channels, ranging from 1 to 3 OFDM symbols. The CCFI is transmitted every subframe with control channels. When CCFI is absent in a subframe, we may assume that no control channel is transmitted in that subframe.

In a third embodiment according to the principles of the present invention, the mapping from resource elements to tree nodes may be cell-specific or change over time. For example, in FIG. 12A, the leaf Node 3 may represent CCE 3 in one subframe and represent CCE in another subframe. Also, at the same time instant, the leaf Node 3 may represent CCE 4 in a first cell and represent CCE 9 in a second cell. Different mapping over time and across cells is beneficial in randomize the interference over time and across cells. It is also possible that the mapping from resource elements to tree nodes is differently for different UEs, as long as the base station can resolve the possible conflict between different mappings.

Figure 13A:
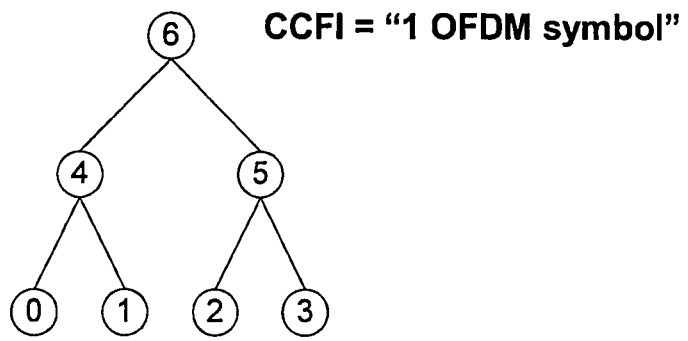
FIG. 13a is an illustrations of a single resource tree constructed when CCFI indicates 1 OFDM symbol.
Figure 13B:
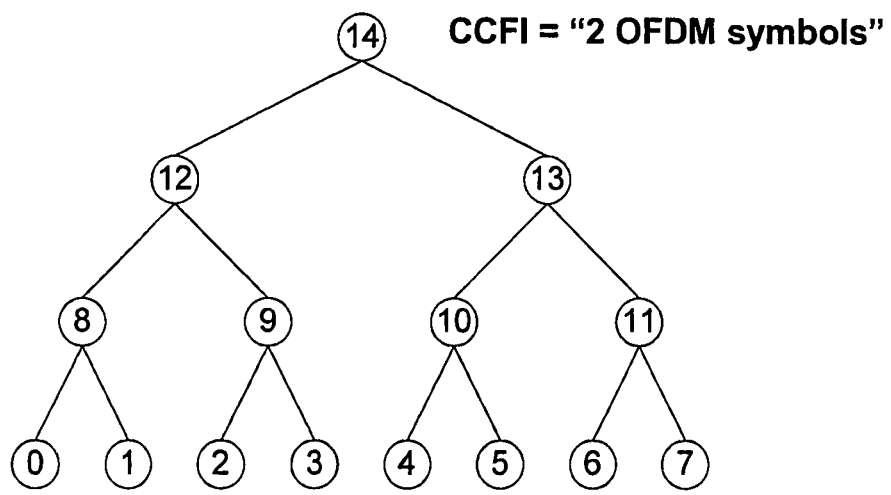
FIG. 13b is an illustrations of a single resource tree constructed when CCFI indicates 2 OFDM symbols.
Figure 13C:
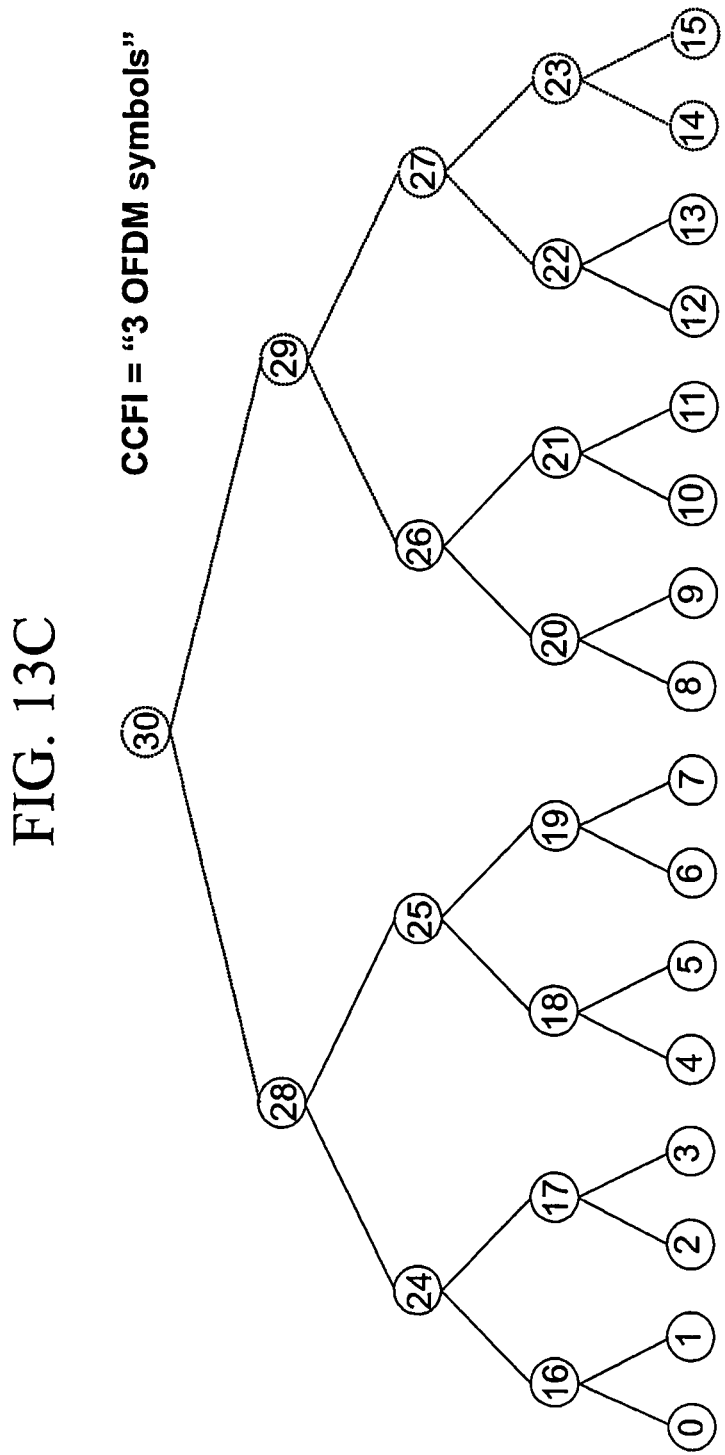
FIG. 13c is an illustrations of multiple resource trees constructed when CCFI indicates 3 OFDM symbols, according to a fourth embodiment of the principles of the present invention.

In a fourth embodiment according to the principles of the present invention, a graph with one or multiple resource trees is constructed in dependence upon the amount of resource elements that are available. As an example, four control channel elements (CCE) may be available for control channel transmission if the Control Channel Format Indicator (CCFI) indicates that the first OFDM symbol is used (CCFI="1 OFDM symbol"). Similarly, eight CCEs may be available for control channel transmission if the CCFI indicates that the first and the second OFDM symbols are used (CCFI="2 OFDM symbols"). In addition, fourteen CCEs may be available for control channel transmission if the CCFI indicates that the first, the second, and the third OFDM symbols are used (CCFI="3 OFDM symbols"). Therefore, as shown in FIG. 13, three graphs are constructed, one for each CCFI value. FIG. 13A shows the graph with one rooted tree for the case of CCFI="1 OFDM symbol"; FIG. 13B shows the graph with one rooted tree for the case of CCFI="2 OFDM symbols"; FIG. 13C shows the graph with one rooted tree for the case of CCFI="3 OFDM symbols".

Figure 14A:
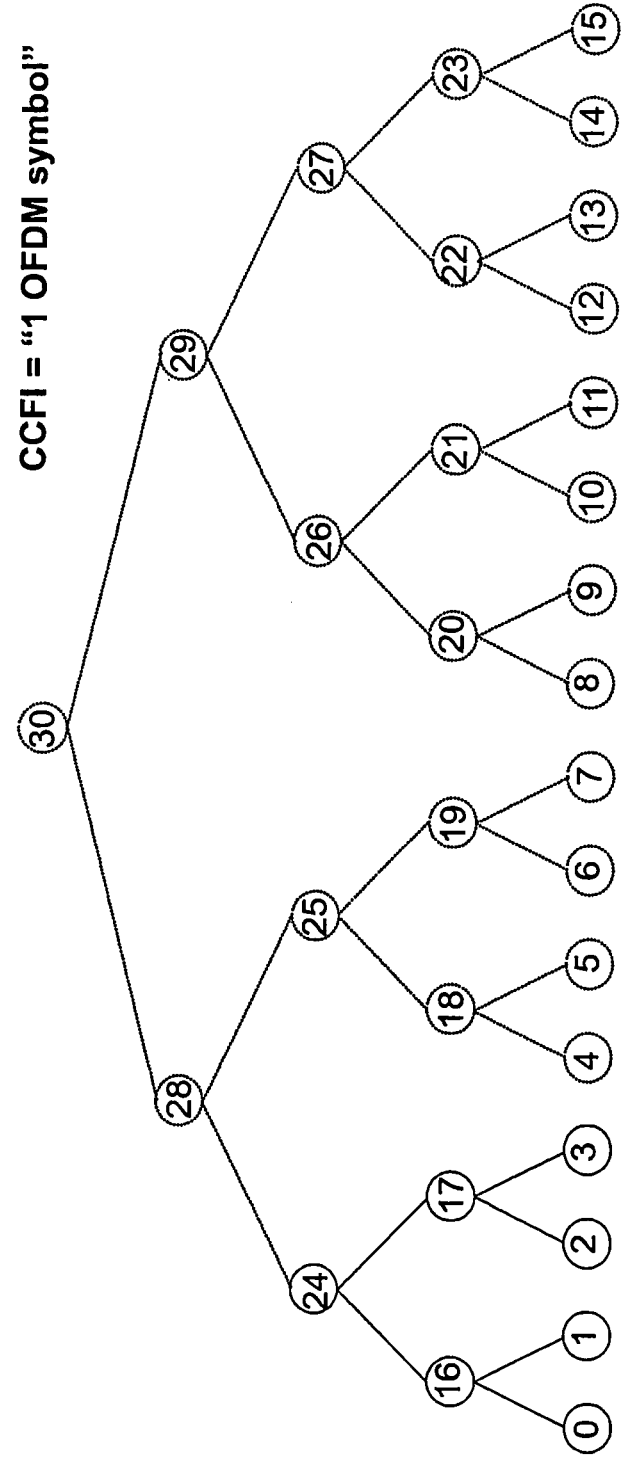
FIG. 14a is an illustrations a single resource tree constructed when CCFI indicates OFDM symbol.
Figure 14B:
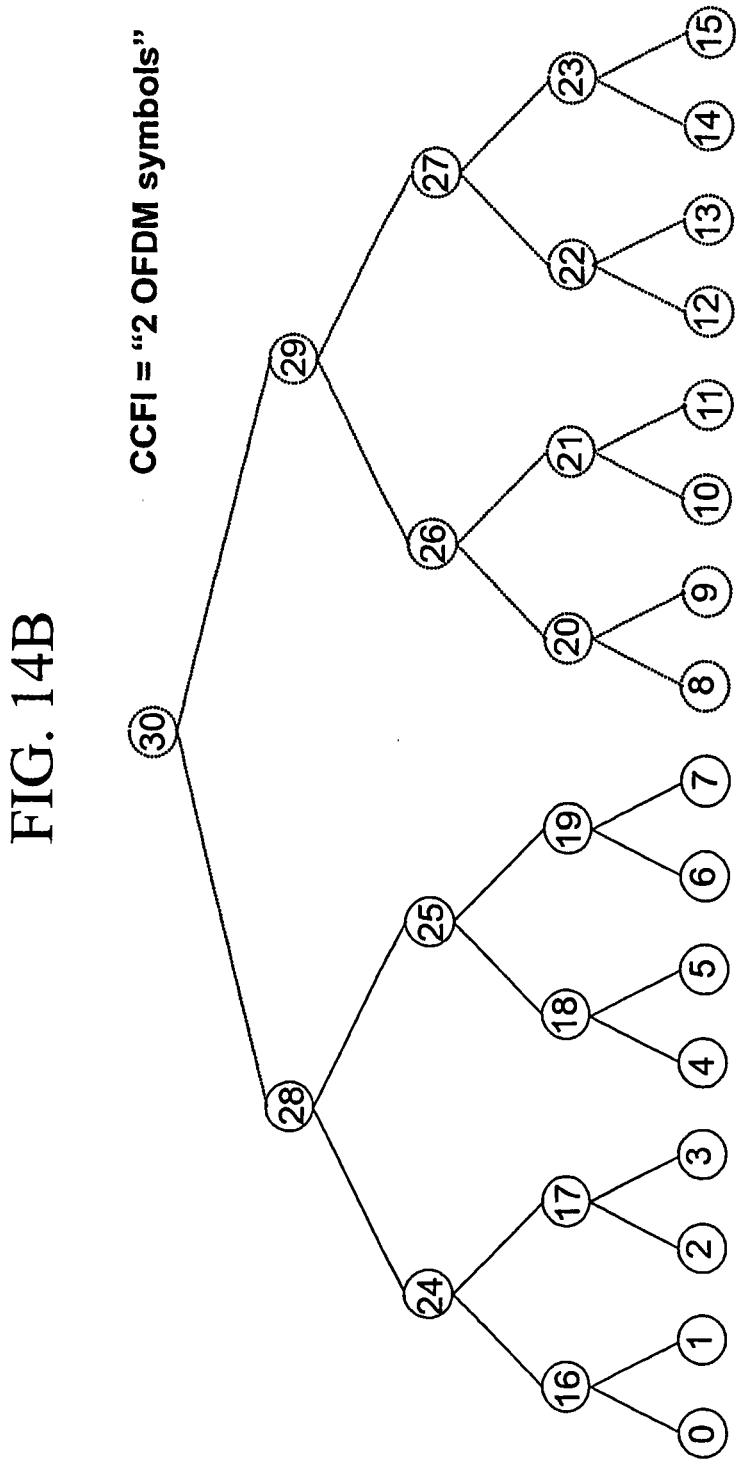
FIG. 14b is an illustrations of a single resource tree constructed when CCFI indicates 2 OFDM symbols.
Figure 14C:
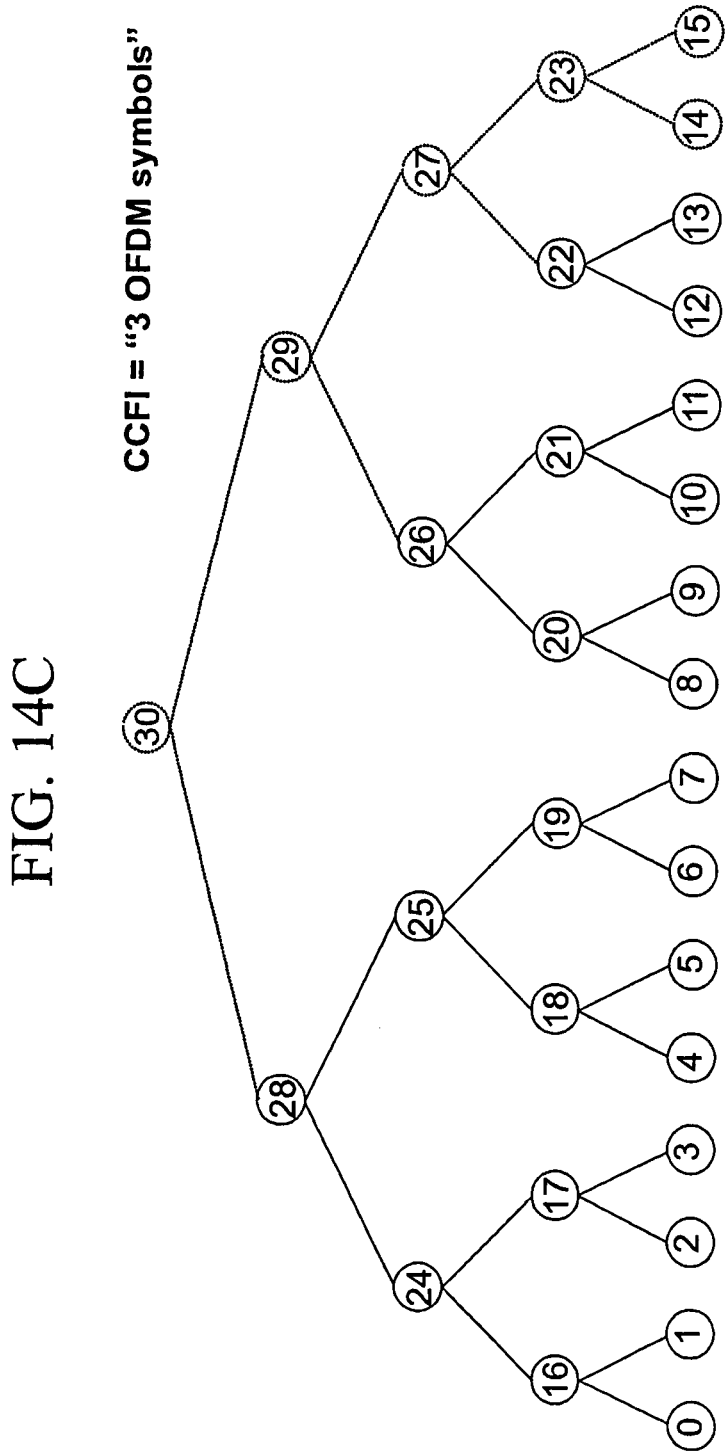
FIG. 14c is an illustrations of a single resource tree constructed when CCFI indicates 3 OFDM symbols, according to a fifth embodiment of the principles of the present invention.

In a fifth embodiment according to the principles of the present invention, the same graph with one or multiple resource trees is used for different amount of resource elements but the mapping scheme of the resource elements to the tree nodes to resource elements changes according to the amount of resource elements available. As shown in FIG. 14, the same graph with one rooted tree can be used for three different CCFI value. The mapping schemes of the it resource elements to the leaf nodes in these three cases are different from each other. For example, as shown in FIG. 14A, when CCFI="1 OFDM symbol" and four control channel elements (CCE) are available for control channel transmission, the resource elements are mapped to leaf nodes 0 through 3. That is, only leaf nodes 0 through 3 have their corresponding resource elements, while leaf nodes 4 through 15 do not have corresponding resource element. As shown in FIG. 14B, when CCFI="2 OFDM symbols", the resource elements are mapped to leaf nodes through 7. As shown in FIG. 14C, when CCFI="3 OFDM symbols", the resource elements are mapped to leaf nodes 0 through 13. Note that when the CCFI value changes, not only the number of the CCEs that are available for control channel transmission changes, but also the CCEs changes. That is, the CCEs that are available for control channel transmission when CCFI="3 OFDM symbols" may not be available for control channel transmission when CCFI="2 OFDM symbols". This embodiment allows the same signaling structure or the same blind decoding procedure to be applied for different CCFI value.

Figure 15A:
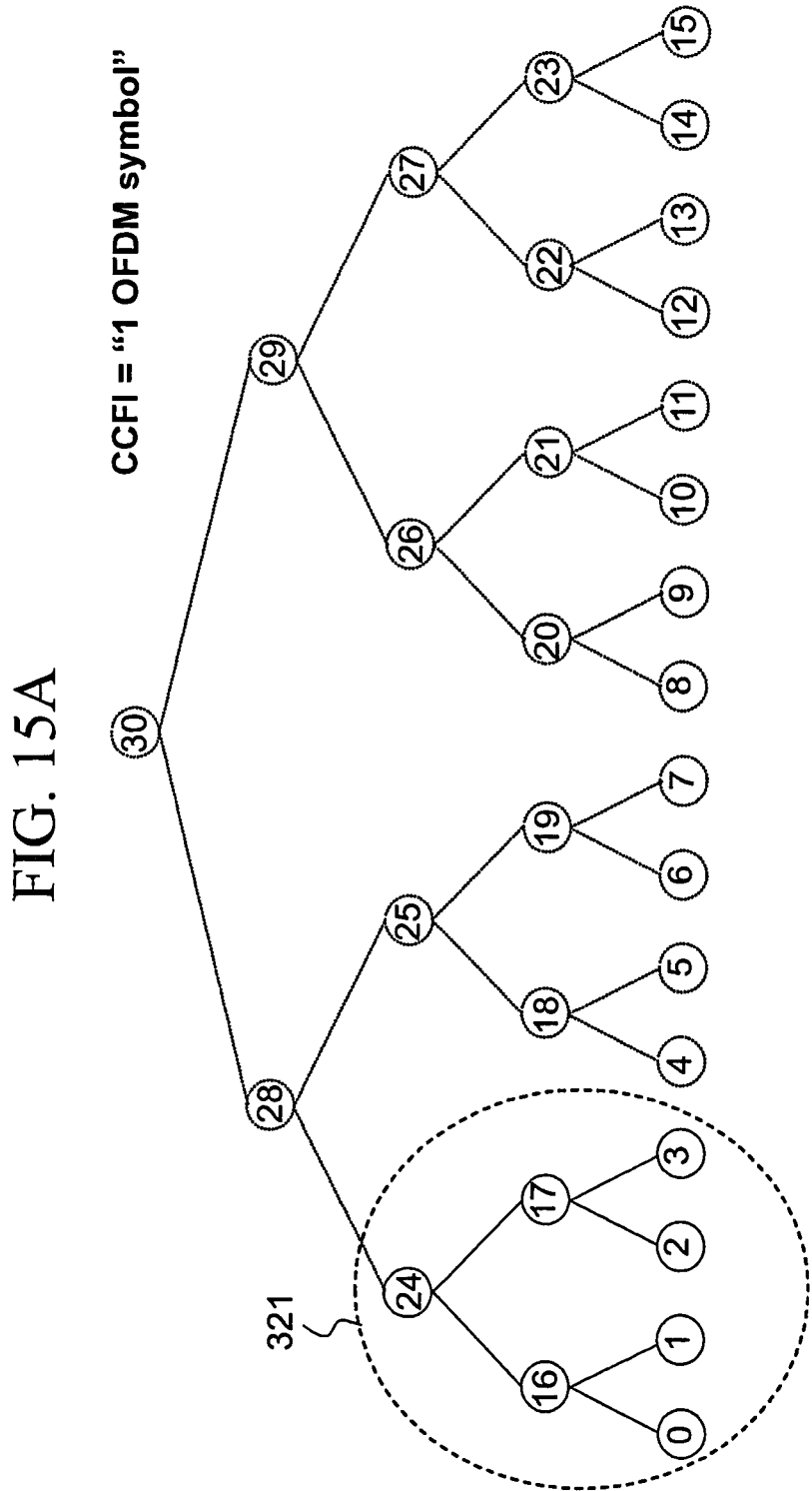
FIG. 15a is an illustrations of a subtree in a single resource tree constructed when CCFI indicates 1 OFDM symbol.
Figure 15B:
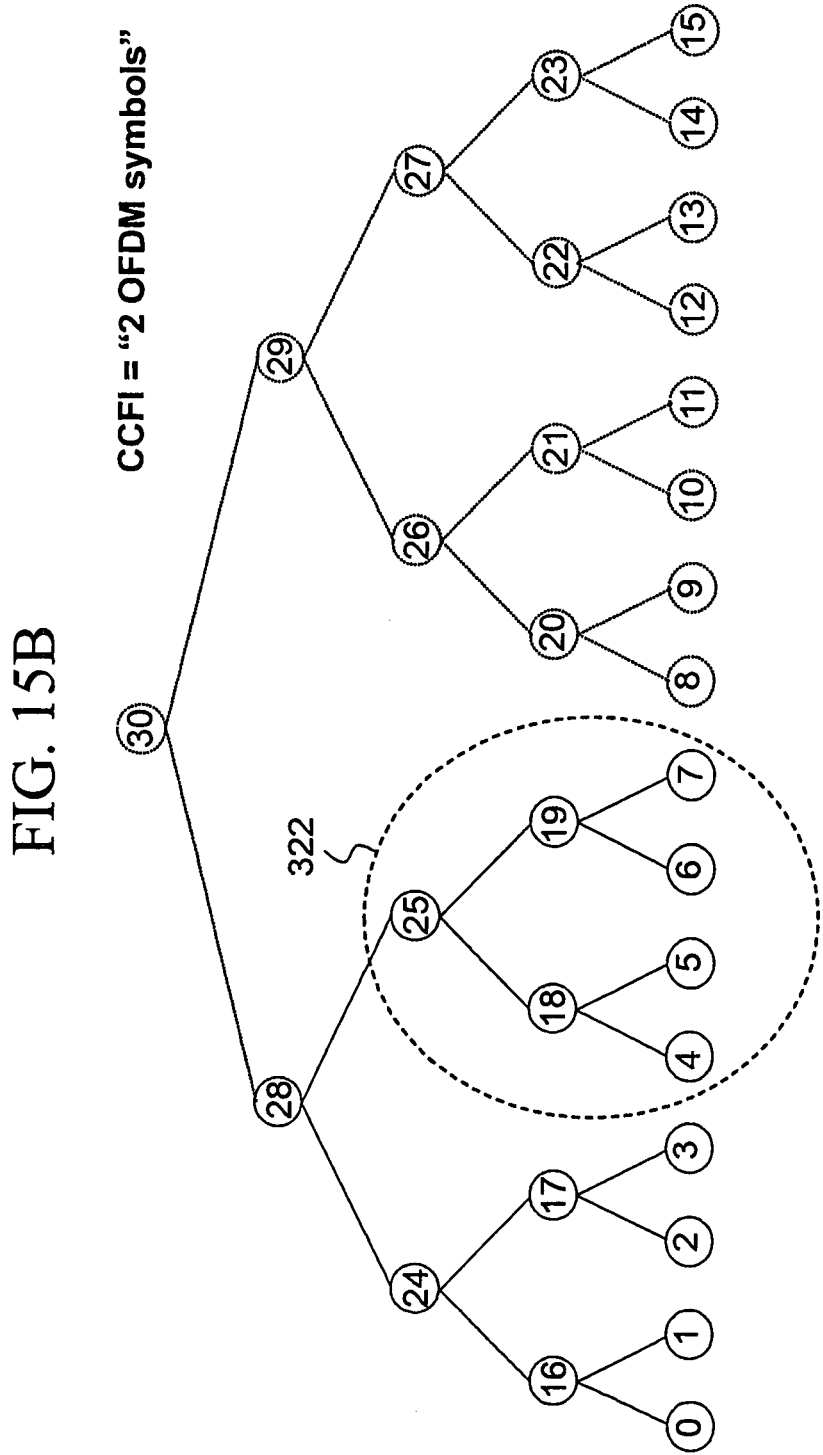
FIG. 15b is an illustrations of a subtree in a single resource tree constructed when CCFI indicates 2 OFDM symbols.
Figure 15C:
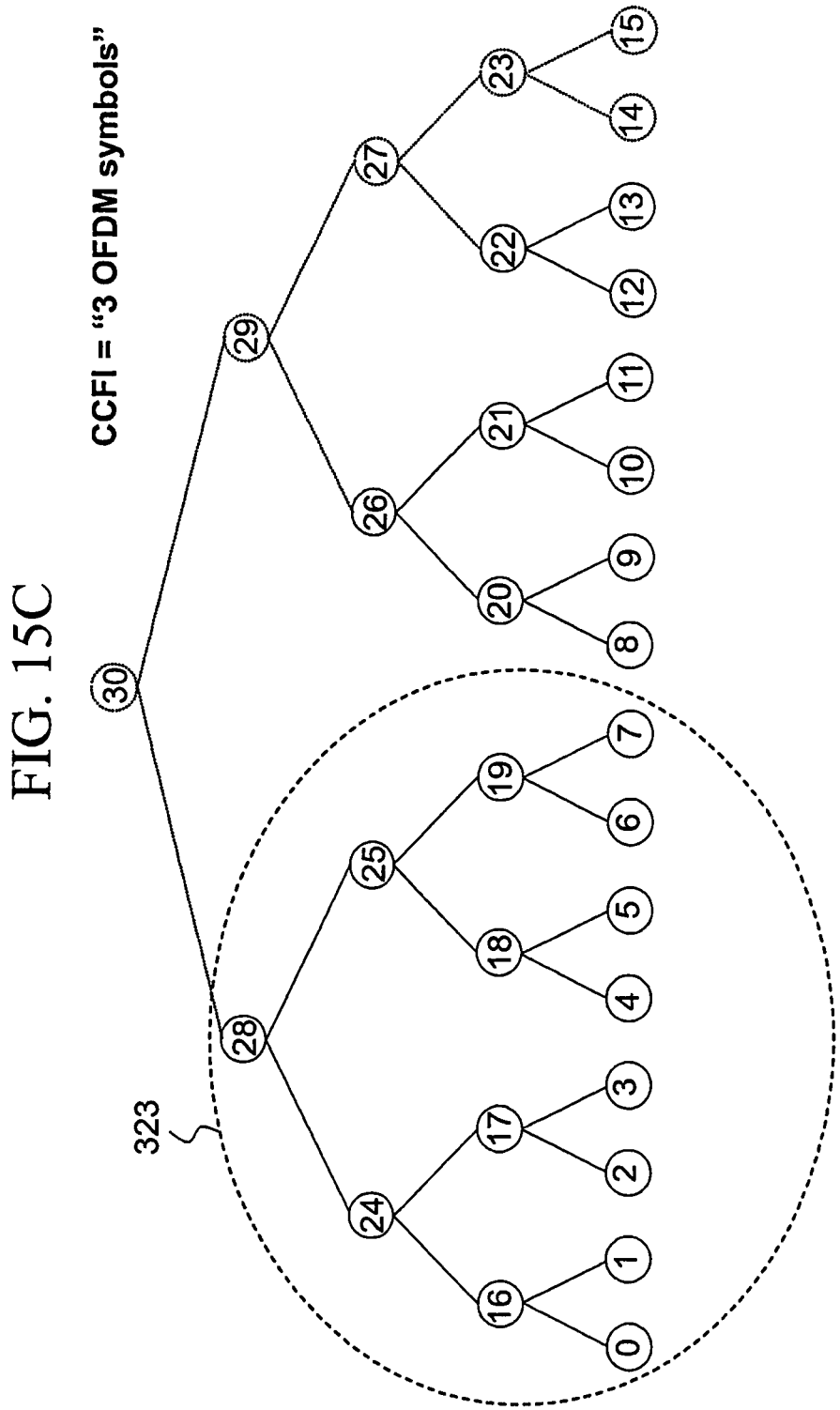
FIG. 15c is an illustrations of a subtree in a single resource tree constructed when CCFI indicates 3 OFDM symbols, according to a sixth embodiment of the principles of the present invention.

In a sixth embodiment according to the principles of the present invention, a tree structure is constructed with a first subtree assigned to a communication station in transmission intervals using a first control channel configuration and a second subtree assigned to the said communication station in transmission intervals using a second control channel configuration. The control channel configuration indicates how many OFDM symbols in a transmission interval are used for the control channel signal transmission. The control channel configuration is usually carried by the CCFI. The control channel configuration is dependent upon the amount of the available resource elements. For example, as shown in FIG. 15a, subtree 321 with root node 24 is assigned to a UE when CCFI="1 OFDM symbol"; in FIG. 15b, subtree 322 with root node is assigned to the same UE when CCFI="2 OFDM symbol"; and in FIG. 15c, subtree 323 with root node 28 is assigned when CCFI="3 OFDM symbol". With this assignment, for a given control channel format as indicated by CCFI, the UE only needs to monitor the resources that belong to the assigned subtree in that configuration. For example, if CCFI="1 OFDM symbol", the UE only needs to monitor resource elements represented by Nodes 0, 1, 2, 3, and the combinations of resource elements according to the structure of subtree 321, because the base station only uses resource elements in the assigned subtree for control channel transmission to this UE. If the CCFI value changes, the UE monitors another subtree accordingly. By assigning different subtrees for different CCFI values, we can optimize the utilization of resources with any given CCFI value and thus improve the system performance.

Figure 16A:
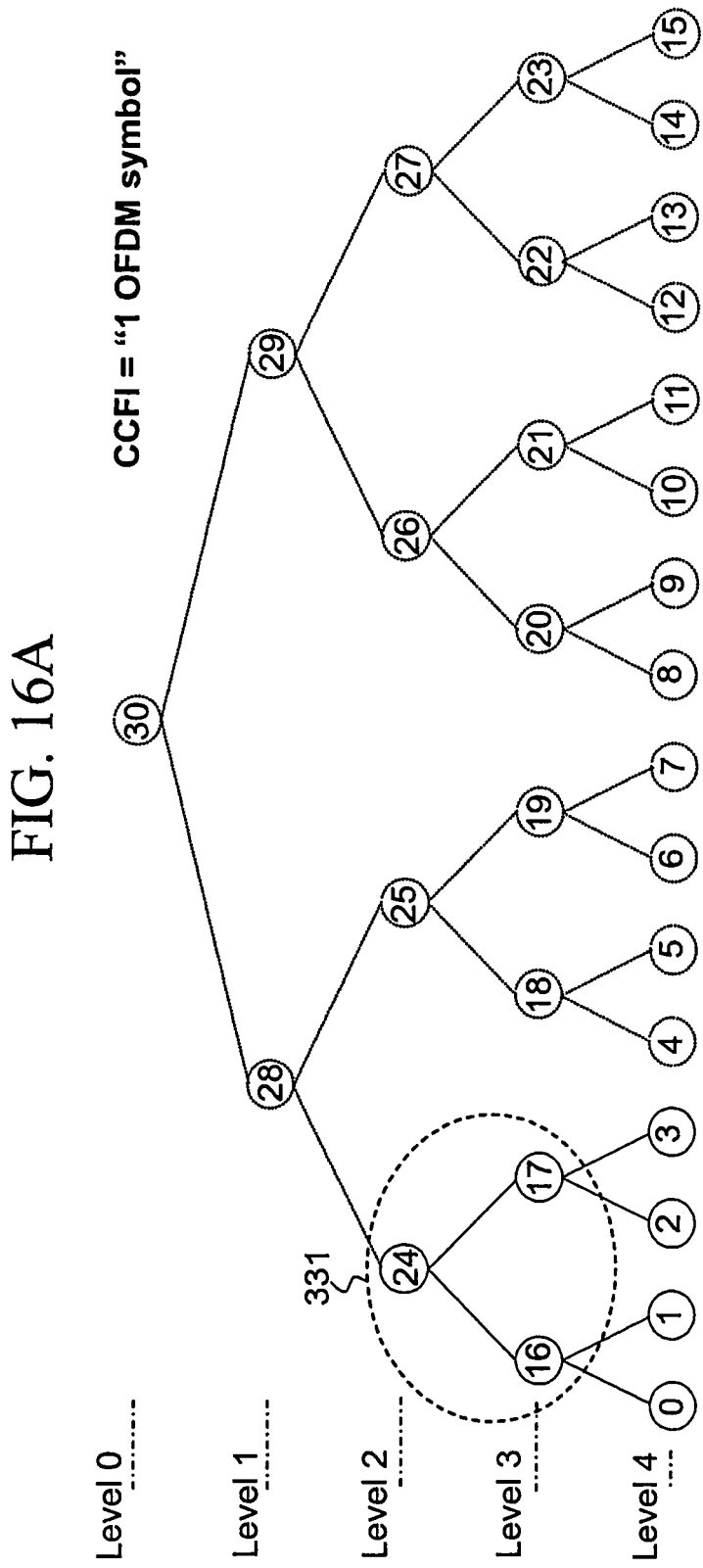
FIG. 16a is an illustrations of a subtree in a single resource tree constructed when CCFI indicates 1 OFDM symbol.
Figure 16B:
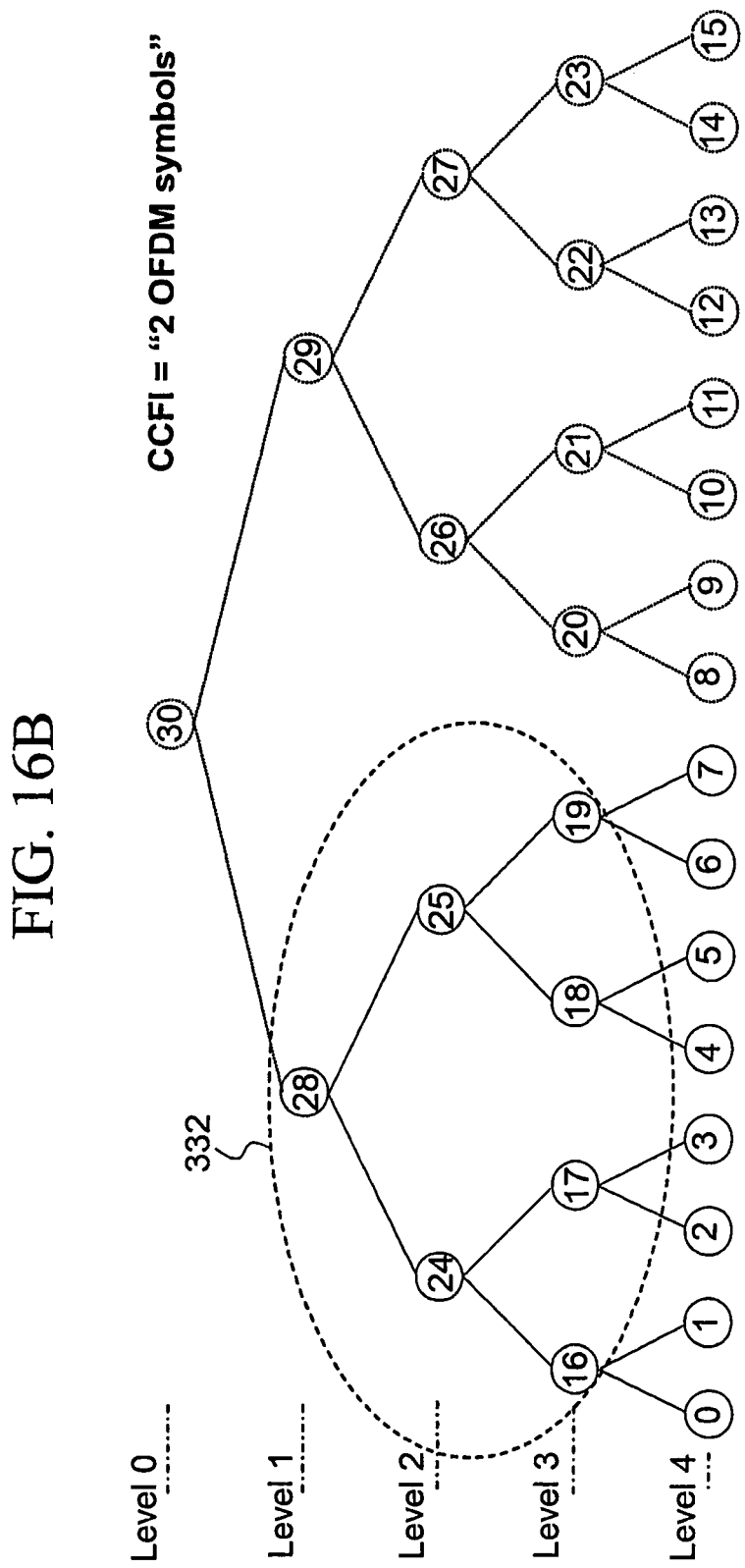
FIG. 16b is an illustrations of a subtree in a single resource tree constructed when CCFI indicates 2 OFDM symbols.

In a seventh embodiment according to the principles of present invention, a subtree assigned to a communication station does not include all level of descendant nodes of the root node of the said subtree. Note that a subtree assigned to a UE does not need to include nodes in all levels. For example, as shown in FIG. 16a, when CCFI="1 OFDM symbol", subtree 331 is assigned to the UE. Subtree 331 only consists of inner nodes 16, 17, and 24, and does not include leaf nodes 0 through 3. In other words, subtree 331 is restricted to levels 2 and 3. Similarly, as shown in FIG. 16b, when CCFI="2 OFDM symbols", subtree 332 is assigned to the UE. That is, subtree 332 is restricted to levels 1 through 3. As shown in FIG. 16c, when CCFI="3 OFDM symbols", subtree 333 is assigned to the UE. That is, subtree 333 is restricted to levels 1 through 3. This kind of assignments can reduce the blind decoding complexity at the UE. For example, if a UE is in a poor geometry, all control channel transmission to that UE will use at least two CCEs. In that case, there is no need for the UE to monitor the control channel transmission with 1 CCEs, i.e., the leaf nodes.

Figure 17A:
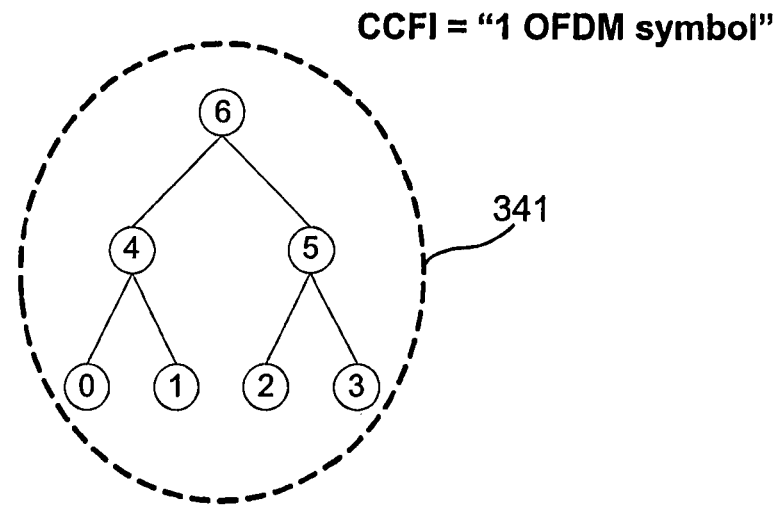
FIG. 17a is an illustrations of a single resource tree constructed when CCFI indicates 1 OFDM symbol.
Figure 17B:
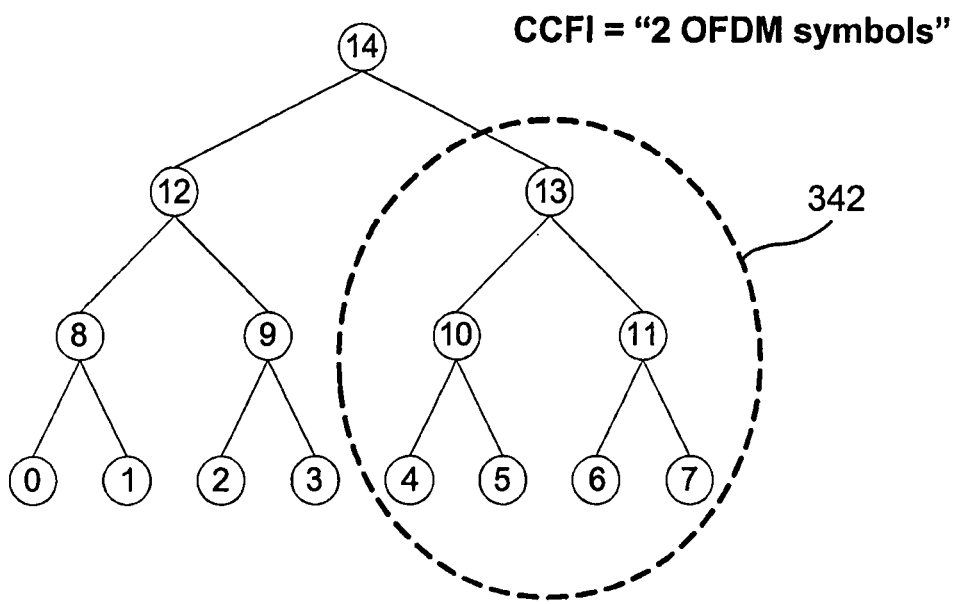
FIG. 17b is an illustrations of a subtree in a single resource tree constructed when CCFI indicates 2 OFDM symbols.
Figure 17C:
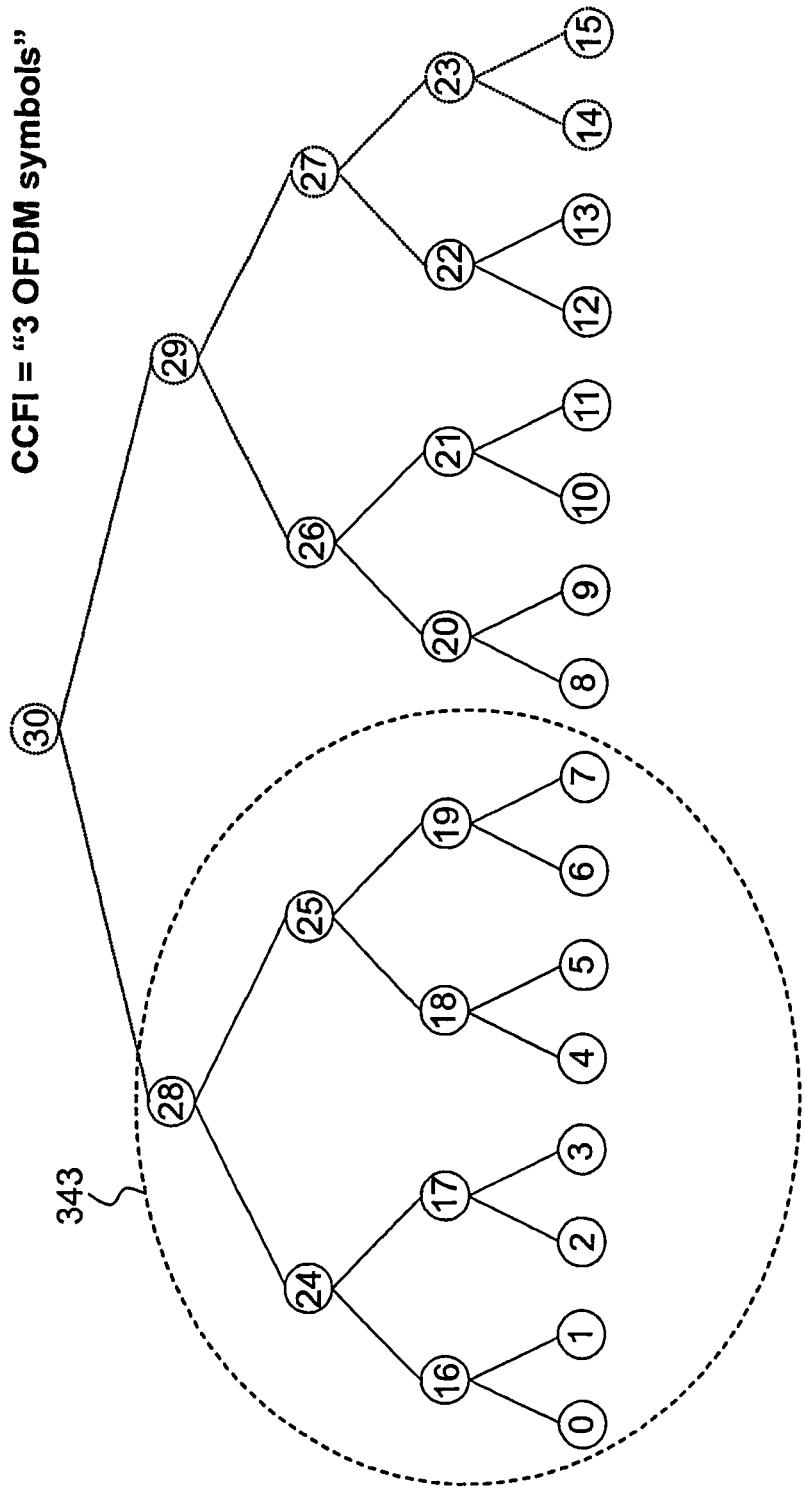
FIG. 17c is an illustrations of a subtree in a single resource tree constructed when CCFI indicates 3 OFDM symbols, according to an eighth embodiment of the principles of the present invention.

In the previous example, we assume the same graph with one rooted tree is used for different CCFI value. The aforementioned embodiments, however, are also applicable when we have different graphs for different CCFI value. In an eighth embodiment according to the principles of the present invention, as shown in FIG. 17, we can also assign a different subtree to a UE for different CCFI value. That is, we can assign different subtrees of different trees to a UE for different CCFI value. Specifically, in FIG. 17a, when CCFI="1 OFDM symbol", subtree 341 is assigned to the UE for control channel transmission. In FIG. 17b, when CCFI="2 OFDM symbols", subtree 342 is assigned to the UE. Subtree 342 is a subtree of a tree with root node 14. In FIG. 17c, when CCFI="3 OFDM symbols", subtree 343 is assigned to the UE. Subtree 342 is a subtree of a tree with root node 30.

Figure 18A:
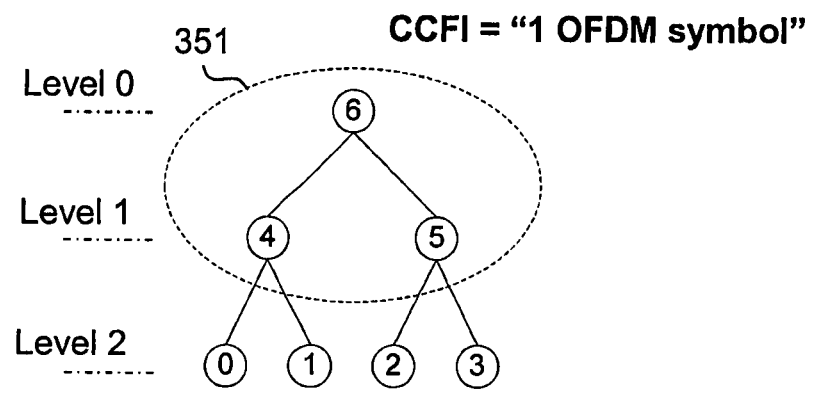
FIG. 18a is an illustrations of a subtree in a single resource tree constructed when CCFI indicates 1 OFDM symbol.
Figure 18B:
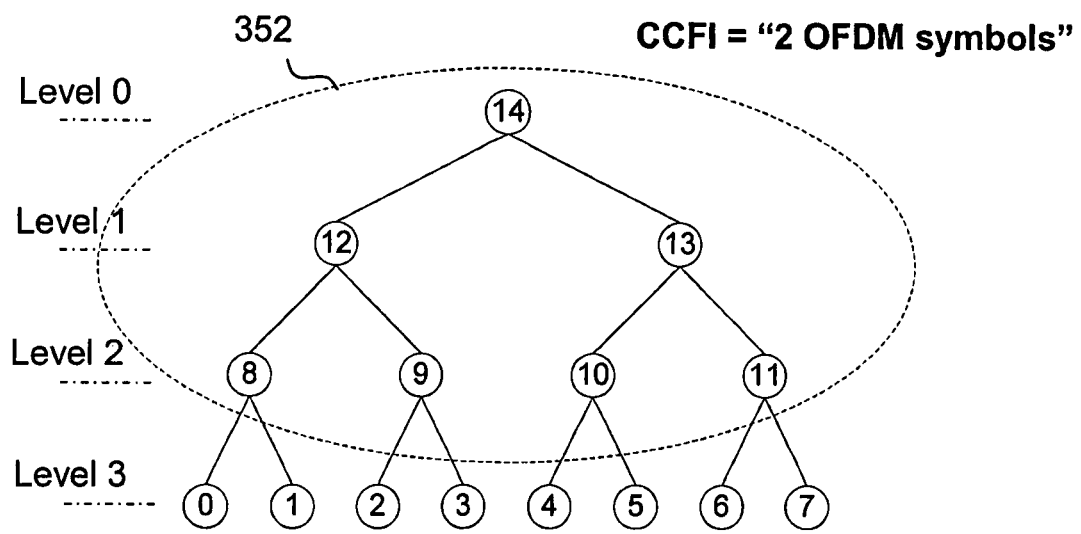
FIG. 18b is an illustrations of a subtree in a single resource tree constructed when CCFI indicates 2 OFDM symbols.
Figure 18C:
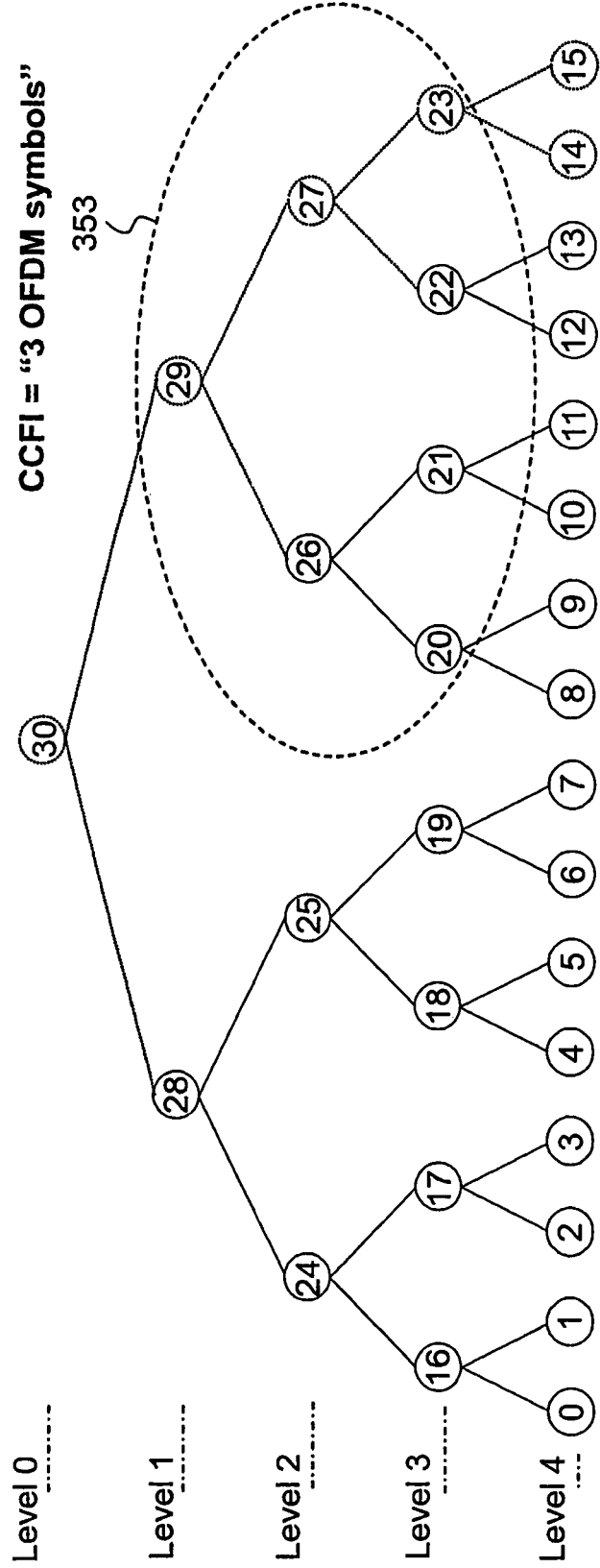
FIG. 18c is an illustrations of a subtree in a single resource tree constructed when CCFI indicates 3 OFDM symbols, according to a ninth embodiment of the principles of the present invention.

In a ninth embodiment according to the principles of the present invention, we can also apply level restriction in the case of different graphs for different CCFI values, as shown in FIG. 18. In FIG. 18a, when CCFI="1 OFDM symbol", the assigned subtree 351 is restricted to levels 0 and 1. In FIG. 18b, when CCFI="2 OFDM symbols", the assigned subtree 352 is restricted to levels 0 through 2. In FIG. 18c, when CCFI="3 OFDM symbols", the assigned subtree 353 is restricted to levels 1 through 3.

In a tenth embodiment according to the principles of the present invention, different sets of transmission formats of control channel transmissions are assigned to different nodes of the tree. The definition of transmission format include, but not limited to, the number of information bits, the coding scheme and coding rate, the modulation scheme. We can define the set of all possible transmission formats of the control channel as $S_{TF}=\{TF_1, TF_2, \ldots, TF_N\}$. Note that each node on the tree corresponds to a resource set for a control channel transmission. For example, as shown in FIG. 18c, node 24 corresponds to the set of resources represented by leaf node 0, 1, 2, and 3. In general, we can define a limited set of transmission format $S_{TF, i} \subseteq S_{TF}$ for node i. This kind of restriction can further reduce the amount of blind decoding the UE needs to do when monitoring the control channel. For example, we can limit the eligible transmission formats for tree nodes such that a node that has four or more leaf nodes as its descendants only uses QPSK modulation. As shown in FIG. 18c, node 24, 25, 26, 28, 29, and 30 only uses QPSK modulation for control channel transmission. Again, this kind of restrictions can be cell-specific, or UE-specific, and may change over time.

In a tenth embodiment according to the principles of the present invention, different sets of control channel messages are assigned to different nodes of the tree. There are different control channel messages such as downlink SISO grant, downlink MIMO grant, uplink SISO grant, uplink MIMO grant, etc. For example, we can limit the eligible control channel messages for tree nodes such that a downlink MIMO grant can only be sent over a tree node that has at least two leaf nodes as its descendants. Again, this kind of restrictions can be cell-specific, or UE-specific, and may change over time.

FIG. 19 is an illustration of a transmitter constructed as an embodiment according to the principles of the present invention. Transmitter 500 is constructed with a modulator 510 for modulating data to be transmitted into a plurality of modulated symbols, a storing unit 520 for storing resource elements in at least one resource tree configurations, a resource selection unit 530 for selecting a resource allocation scheme from among the plurality of resource allocation schemes represented by the nodes of the at least one resource tree, and a front end processing unit 540 for processing the plurality of modulated symbols according to the selected resource allocation scheme and transmitting the plurality of processed modulated symbols through at least one antenna.

FIG. 20 is an illustration of a receiver constructed as an embodiment according to the principles of the present invention. Receiver 600 is constructed with a front end processing unit 610 for receiving data symbols, a storing unit 620 for storing resource elements in at least one resource tree configurations, and a decoder 630 for decoding the received data.

What is claimed is:

1. A method of data transmission, the method comprising:
generating at least one resource tree, each resource tree comprising a plurality of nodes comprising a root node and at least one leaf node, linked by zero, and one or more inner nodes, wherein the root node has no ancestor, and each leaf node is a resource element;
mapping a plurality of control channel elements into respective leaf nodes in the at least one resource tree according to a certain mapping scheme, each node in the at least one resource tree representing a resource allocation scheme for data transmission;
transmitting an orthogonal frequency division multiplexed (OFDM) formatted signal comprising the plurality of control channel elements using a resource allocation scheme selected from among the plurality of resource allocation schemes represented by respective nodes in the at least one resource tree;
changing the mapping scheme of the plurality of control channel elements into different respective leaf nodes in the at least one resource tree; and
subsequent to transmitting the OFDM formatted signal, transmitting another OFDM formatted signal according to the changed mapping scheme.

2. The method of claim 1, further comprising:
mapping each of the leaf nodes with control channel elements corresponding to one control channel element, and representing a resource allocation scheme where the corresponding control channel element is allocated for transmission of the OFDM formatted signal,
wherein each of the root nodes corresponds to a combination of control channel elements represented by the descendant leaf nodes of said root node, and each of the root nodes represents a resource allocation scheme where the corresponding combination of control channel elements are allocated for transmission of the OFDM formatted signal.

3. The method of claim 2, wherein each of the inner nodes corresponds to a combination of control channel elements represented by the descendant leaf nodes of said inner node, and each of the inner nodes represents a resource allocation scheme where the corresponding combination of control channel elements are allocated for transmission of the OFDM formatted signal.

4. The method of claim 1, wherein at least one leaf node does not correspond to any control channel element, and does not represent any resource allocation scheme.

5. The method of claim 1, further comprising:
responding to reception of the data at a receiver by decoding the data by recursively applying the plurality of resource allocation schemes represented by respective nodes in the at least one resource tree until data in the OFDM formatted signal is decoded.

6. The method of claim 1, further comprising:
mapping the mapping scheme for the plurality of control channel element into respective leaf nodes being specific for different cells covered by corresponding base stations.

7. The method of claim 1, further comprising:
mapping the mapping scheme for the plurality of control channel element into respective leaf nodes being specific for different receivers.

8. The method of claim 1, further comprising:
generating the at least one resource trees that are dependent upon the number of control channel elements that are available for transmission of the OFDM formatted signal.

9. The method of claim 1, further comprising:
mapping the mapping scheme for the plurality of control channel elements into respective leaf nodes being dependent upon the number of control channel elements that are available for transmission of the OFDM formatted signal.

10. The method of claim 1, further comprising:
assigning different subtrees of the at least one resource trees for different transmitters that are using different number of control channel elements for transmission of the OFDM formatted signal.

11. The method of claim 10, further comprising:
decoding the received data by recursively applying a set of resource allocation schemes that are represented by respective nodes in the assigned subtree according to the number of control channel elements that are used for transmission of the OFDM formatted signal until data in the OFDM formatted signal is decoded.

12. The method of claim 1, further comprising:
assigning different subtrees of the at least one resource trees for different number of control channel elements that are available for the data transmission, with at least one subtree consisting of selected levels of inner nodes.

13. The method of claim 12, further comprising:
decoding the received data by recursively applying a set of resource allocation schemes that are represented by respective nodes in the assigned subtree according to the number of available control channel elements until data in the OFDM formatted signal is decoded.

14. The method of claim 1, further comprising:
assigning a set of transmission formats to each node of the at least one resource tree, with the transmission format comprising information of the number of information bits, a coding scheme, a coding rate, and a modulation scheme.

15. The method of claim 14, further comprising:
the received data by recursively applying a set of resource allocation schemes that are represented by respective nodes in the at least one resource tree, and recursively applying the set of transmission formats in each node, until data in the OFDM formatted signal is decoded.

16. The method of claim 1, wherein the control channel message comprises down link single input single output grant, downlink multiple input multiple output grant, uplink single input single output grant, and uplink input multiple output grant.

17. The method of claim 1, wherein:
the resource allocation scheme represented by each node is different from the resource allocation scheme represented by another node in a same resource tree, such that each plurality of nodes of each resource tree in the at least one resource tree represents at least as many resource allocation schemes as nodes in the plurality of nodes.

18. A transmitter configured to transmit data, the transmitter comprising:
a modulator configured to modulate data to be transmitted into a plurality of modulated symbols;
a memory configured to store control channel elements in at least one resource tree configuration, with each resource tree comprising a plurality of nodes comprising a root node and at least one leaf node, linked by zero, and one or more inner nodes, wherein the root node has no ancestor, and each leaf node is a resource element, and each node in the at least one resource tree representing a resource allocation scheme for data transmission, the control channel elements forming a portion of an orthogonal frequency division multiplexed (OFDM) formatted signal;
a resource selection unit configured to select a resource allocation scheme from among the plurality of resource allocation schemes represented by the nodes of the at least one resource tree, mapping a first of the plurality of control channel elements into respective leaf nodes in the at least one resource tree according to a first mapping scheme, and mapping a second of the plurality of control channel elements into different respective leaf nodes in the at least one resource tree according to a subsequent second mapping scheme, the first mapping scheme being different than the subsequent second mapping scheme; and
a front end processing unit configured to:
process the plurality of modulated symbols according to the selected resource allocation scheme,
transmit the plurality of processed modulated symbols comprising the first plurality of control channel elements, and
subsequent to transmitting the plurality of processed modulated symbols comprising the first plurality of control channel elements, transmit the plurality of processed modulated symbols comprising the second plurality of control channel elements, and
wherein the plurality of modulated symbols comprises the first and second plurality of control channel elements.

19. The transmitter of claim 18, wherein:
each of the leaf nodes are mapped with control channel elements corresponding to one control channel element, and representing a resource allocation scheme where the corresponding control channel element is allocated for data transmission, and
each of the root nodes corresponding to a combination of control channel elements represented by the descendant leaf nodes of said root node, and representing a resource allocation scheme where the corresponding combination of control channel elements are allocated for data transmission.

20. The transmitter of claim 19, wherein:
each of the inner nodes correspond to a combination of control channel elements represented by the descendant leaf nodes of said inner node, and representing a resource allocation scheme where the corresponding combination of control channel elements are allocated for data transmission.

21. A receiver configured to receive data, the receiver comprising:
a front end processing unit configured to receive data symbols;
a storing unit configured to store control channel elements in at least one resource tree configurations, with each resource tree comprising a plurality of nodes comprising a root node and at least one leaf nodes, linked by zero, one or more inner nodes, wherein the root node has no ancestor, and each leaf node is a resource element, a plurality of control channel elements being mapped into respective leaf nodes in the at least one resource tree according to a first and a subsequent second mapping scheme, the respective leaf nodes of the first mapping scheme being different from respective leaf nodes of the subsequent second mapping scheme, and each node in the at least one resource tree representing a resource allocation scheme for data transmission, the control channel elements forming a portion of an orthogonal frequency division multiplexed (OFDM) formatted signal; and
a decoder configured to decode a first portion of the received data by recursively applying a resource allocation scheme represented by the nodes in the resource trees stored in the storing unit until the first portion of the data is decoded according to the first mapping scheme, and subsequent to decoding the first portion, decode a second portion of the received data by recursively applying a resource allocation scheme represented by the nodes in the resource trees stored in the storing unit until the second portion of the data is decoded according to the subsequent second mapping scheme.

22. The receiver of claim 21, wherein:
each of the leaf nodes are mapped with control channel elements corresponding to one resource element, and representing a resource allocation scheme where the corresponding control channel element is allocated for data transmission, and
each of the root nodes corresponds to a combination of control channel elements represented by the descendant leaf nodes of said root node, and representing a resource allocation scheme where the corresponding combination of control channel elements are allocated for data transmission.

23. The receiver of claim 22, wherein:
each of the inner nodes corresponds to a combination of control channel elements represented by the descendant leaf nodes of said inner node, and representing a resource allocation scheme where the corresponding combination of control channel elements are allocated for data transmission.

* * * * *